US010520669B2

(12) United States Patent
Mihailov et al.

(10) Patent No.: US 10,520,669 B2
(45) Date of Patent: Dec. 31, 2019

(54) AUTOMATED SYSTEM FOR TRANS-JACKET FIBRE BRAGG GRATING INSCRIPTION AND MANUFACTURING

(71) Applicant: National Research Council of Canada, Ottawa (CA)

(72) Inventors: Stephen Mihailov, Kanata (CA); Dan Grobnic, Ottawa (CA); Rune Lausten, Ottawa (CA); Robert Walker, Spencerville (CA); Ping Lu, Ottawa (CA); Huimin Ding, Nepean (CA); David Coulas, Ottawa (CA); Cyril Hnatovsky, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 15/693,556

(22) Filed: Sep. 1, 2017

(65) Prior Publication Data

US 2018/0067254 A1    Mar. 8, 2018

Related U.S. Application Data

(60) Provisional application No. 62/382,796, filed on Sep. 2, 2016.

(51) Int. Cl.
*G02B 6/02* (2006.01)
*G02B 5/18* (2006.01)
(Continued)

(52) U.S. Cl.
CPC ....... *G02B 6/02138* (2013.01); *G02B 5/1857* (2013.01); *G02B 6/021* (2013.01);
(Continued)

(58) Field of Classification Search
None
See application file for complete search history.

(56) References Cited

U.S. PATENT DOCUMENTS

| 4,804,950 A | 2/1989 | Moon et al. |
| 4,807,950 A | 2/1989 | Glenn et al. |

(Continued)

FOREIGN PATENT DOCUMENTS

| CA | 2978018 A1 * | 3/2018 | ........... G02B 5/1857 |
| JP | 3427961 B2 | 7/2003 | |

(Continued)

OTHER PUBLICATIONS

Thomas, Jens Ulrich (Mode control with ultra-short pulse written fiber Bragg gratings, 2012). (Year: 2012).*

(Continued)

*Primary Examiner* — Michelle R Connelly
(74) *Attorney, Agent, or Firm* — Miltons IP/p.i.

(57) ABSTRACT

There is provided an alignment system and method for use in an ultrashort pulse duration laser-based Fiber Bragg Grating (FBG) writing system, the alignment system comprising: clamps configured to hold a coated optical fiber in a position perpendicular to a beam path of an ultrashort pulse duration laser-based FBG writing station; an optical detector; and a control system with an input from the optical detector and an output to adjust parameters of an optical source and the FBG writing station adjust a distance between the optical fiber and an optical source of the writing station based on luminescence generated in a core of the optical fiber as indicated in a signal received at the input from the optical detector.

14 Claims, 17 Drawing Sheets

(51) Int. Cl.
  *G02B 6/42*   (2006.01)
  *G02B 6/26*   (2006.01)
(52) U.S. Cl.
  CPC ......... *G02B 6/02128* (2013.01); *G02B 6/262* (2013.01); *G02B 6/4219* (2013.01); *G02B 2006/02161* (2013.01)

(56) References Cited

U.S. PATENT DOCUMENTS

| | | | |
|---|---|---|---|
| 5,287,427 A | | 2/1994 | Atkins et al. |
| 5,367,588 A | | 11/1994 | Hill et al. |
| 5,400,422 A | | 3/1995 | Askins et al. |
| 5,914,207 A | | 6/1999 | Nishiki et al. |
| 5,945,261 A | | 8/1999 | Rourke |
| 6,272,886 B1 | * | 8/2001 | Novack .............. G02B 6/02123 430/290 |
| 6,487,939 B1 | | 12/2002 | Cowher et al. |
| 6,503,327 B2 | | 1/2003 | Nelson |
| 6,522,808 B1 | | 2/2003 | Burt et al. |
| 6,532,327 B1 | | 3/2003 | Gatica et al. |
| 6,753,118 B2 | * | 6/2004 | Deshmukh ......... G02B 6/02085 359/569 |
| 6,778,741 B2 | | 8/2004 | Lefebvre |
| 6,898,350 B2 | | 5/2005 | Iler et al. |
| 6,934,459 B2 | | 8/2005 | Lefebvre |
| 6,993,221 B2 | | 1/2006 | Mihailov et al. |
| 7,031,571 B2 | | 4/2006 | Mihailov et al. |
| 7,033,519 B2 | | 4/2006 | Taylor et al. |
| 7,085,450 B2 | | 8/2006 | Biyikli et al. |
| 7,095,931 B2 | * | 8/2006 | Sezerman ........... C03C 23/0025 385/123 |
| 7,164,841 B2 | | 1/2007 | Lefebvre |
| 7,440,653 B2 | | 10/2008 | Smith et al. |
| 7,689,087 B2 | | 3/2010 | Mihailov et al. |
| 8,515,224 B2 | | 8/2013 | Vallee et al. |
| 2004/0218859 A1 | | 11/2004 | Yamashita et al. |
| 2006/0093265 A1 | * | 5/2006 | Jia ......................... B23K 26/03 385/37 |
| 2007/0091977 A1 | * | 4/2007 | Sohn .................. G02B 6/02147 372/109 |
| 2009/0274420 A1 | | 11/2009 | Vallee et al. |

FOREIGN PATENT DOCUMENTS

| | | |
|---|---|---|
| WO | 2015154177 A1 | 10/2015 |
| WO | 2016/004511 A1 | 1/2016 |
| WO | 2016004511 A1 | 1/2016 |

OTHER PUBLICATIONS

Chao et al. ("Grating writing through the fiber coating using a 248nm excimer laser", OFC/IOOC, Technical Digest, Optical Fiber Communication Conference, 1999, and the International Optics and Optical Fiber Communcation, Feb. 21-26, 1999). (Year: 1999).*

Espindola et al. ("Highly Reflective Fiber Bragg Gratings Written Through a Vinyl Ether Fiber Coating", IEEE Photonics Technology Letters, vol. 11, No. 7, Jul. 1999). (Year: 1999).*

Mihailov et al. ("Grating Writing Through the Polyimide Fibre Coating with Femtosecond IR Radiation and a Phase Mask", ECOC 2008, Sep. 21-25, 2008). (Year: 2008).*

Chao et al. ("Grating writing through fibre coating at 244 and 248 nm", Electronics Letters, vol. 35, No. 11, May 27, 1999). (Year: 1999).*

Ahmed et al. ("Bragg grating fabrication in microfiber by femto-second pulse filamentation induced periodic refracitive index modification", Proc. of SPEI vol. 9350, 2015). (Year: 2015).*

Extended European Search Report issued on European Patent Application No. 17189135.1 dated Jan. 5, 2018; 8 pages.

Komukai et al.; "Fabrication of high-quality long-fiber Bragg grating by monitoring 3.1-eV radiation (400 nm) from GeO defects"; IEEE Photonics Technology Letters; vol. 8, No. 11; Nov. 1, 1996, pp. 1495-1497.

Thomas, J. et al. "Inscription of fiber Bragg gratings with femto-second pulses using a phase mask scanning technique" Applied Physics A; 86, 153-157(2007); Published online: Nov. 18, 2006.

Watanabe, M. et al. "Luminescence and defect formation by visible and near-infrared irradiation of vitreous silica"; The American Physical Society; Physical Review B; vol. 60, No. 14; Oct. 1, 1999-II pp. 9959-9964.

Kondo, Y. et al. "Fabrication of long-period fiber gratings by focused irradiation of infrared femtosecond laser pulses"; Optics Letters; vol. 24, No. 10; May 15, 1999; pp. 646-648.

Komukai, T. et al. "Fabrication of High-Quality Long-Fiber Bragg Grating by Monitoring 3.1-eV Radiation (400 nm) from GeO Defects"; IEEE Photonic Technology Letters; vol. 8, No. 11; Nov. 1996; pp. 1495-1497.

* cited by examiner

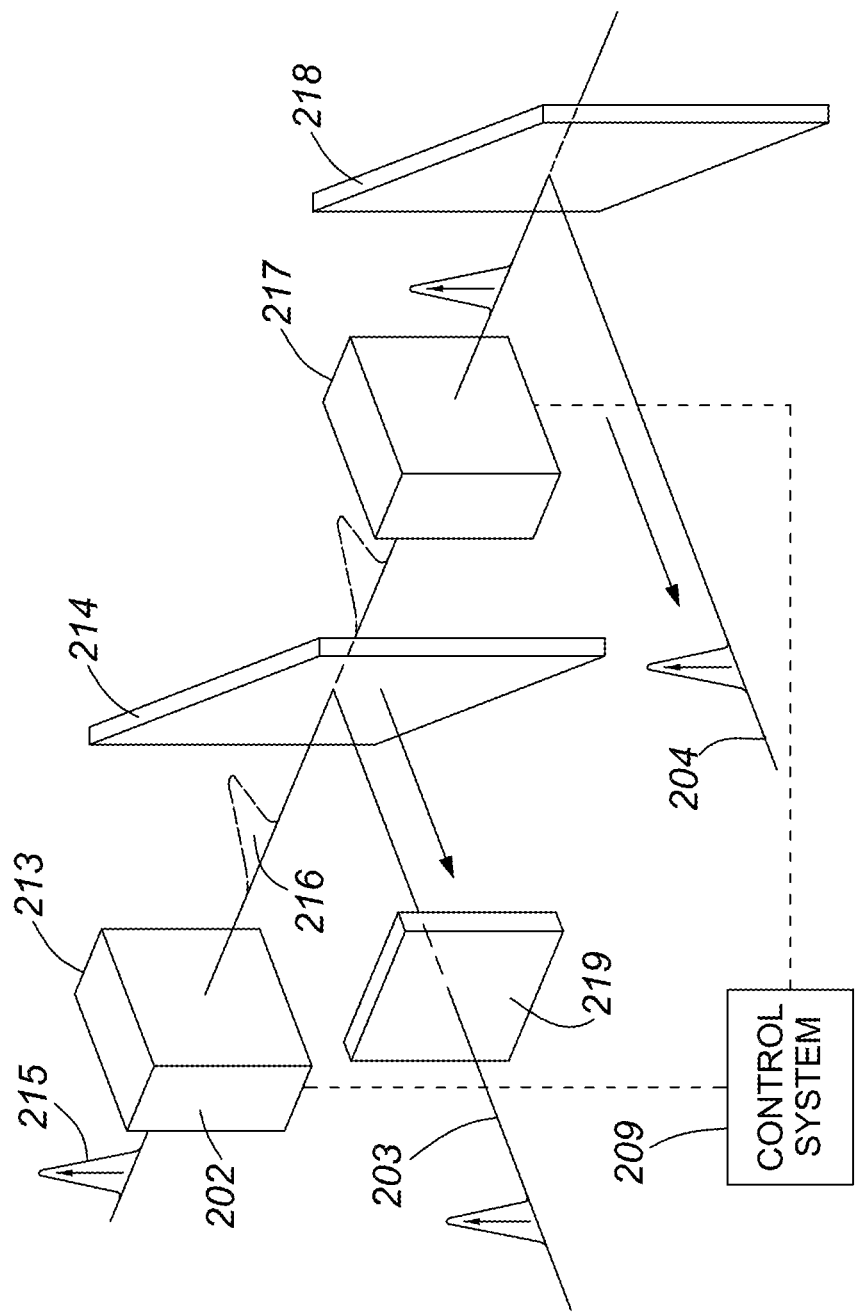

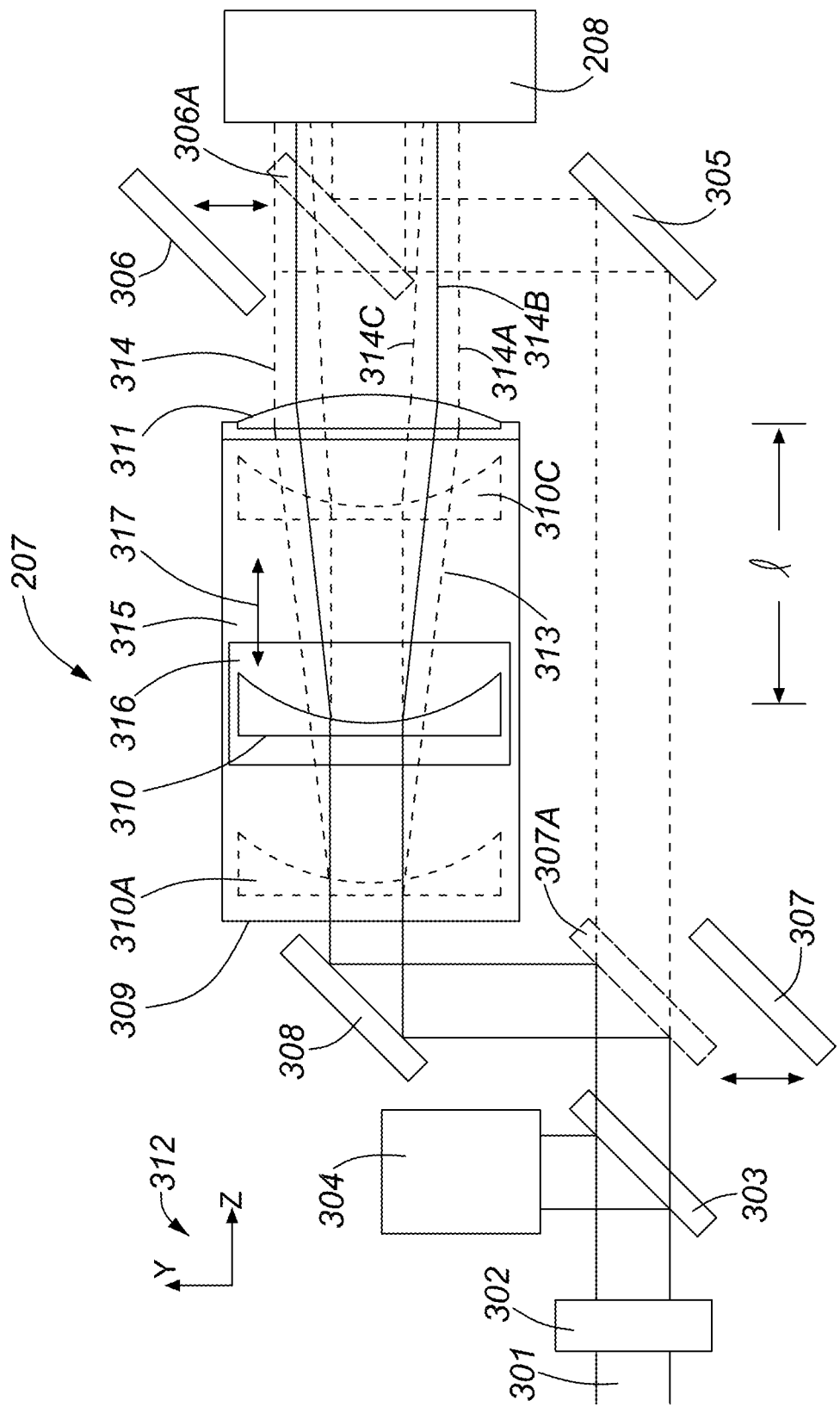

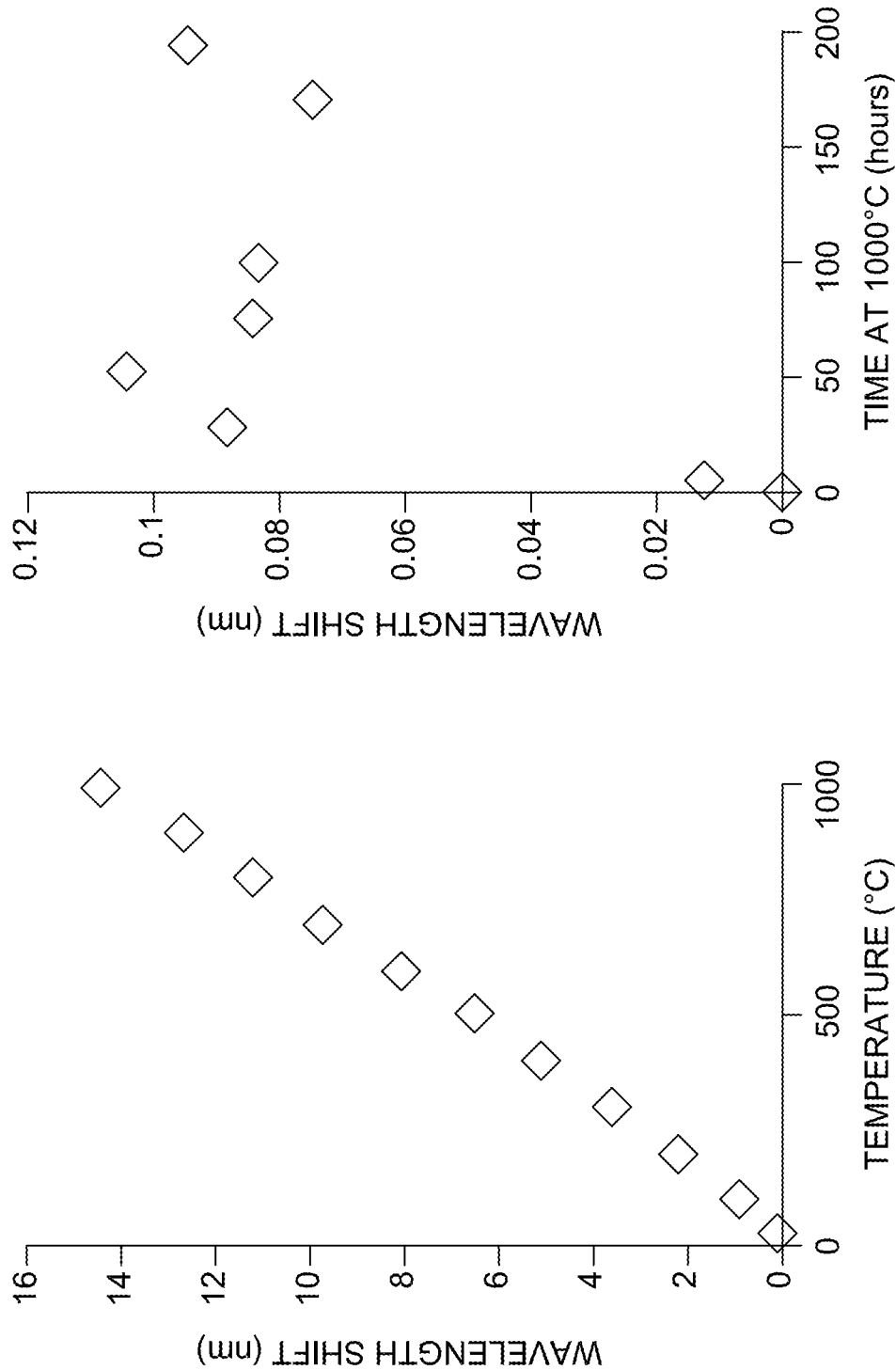

AUTOMATED SYSTEM FOR TRANS-JACKET FIBRE BRAGG GRATING INSCRIPTION AND MANUFACTURING

TECHNICAL FIELD

The present disclosure relates generally to systems for manufacturing optical components, and particularly to systems and methods optimizing the utilization of femtosecond pulse duration laser systems for the writing of fiber Bragg gratings and other similar components.

BACKGROUND

Fiber Bragg gratings (FBGs) are optical filters that are inscribed into the core region of a single mode optical fiber waveguide using high powered laser systems. Bragg gratings have found many applications in the telecommunication industry as optical filters for dense wavelength division multiplexing application because of their compatibility with other optical network components. They have been used as add/drop multiplexers, applied for stabilization of pump lasers used in Erbium doped optical amplifiers, flattening the spectral gain responses of optical amplifiers and for compensation of chromatic dispersion in legacy optical fiber networks.

Aside from their extensive applications in the telecom domain, FBGs have also demonstrated themselves to be attractive devices for sensing temperature and strain along an optical fiber. Variations in the spectral response of the grating result from period changes in the Bragg grating due to strains or temperature variations that are experienced by the in-situ optical fiber. These FBG sensors offer important advantages over other sensor technologies because of their electrically passive operation, electromagnetic interference (EMI) immunity, high sensitivity and multiplexing capabilities. Fiber Bragg gratings are simple, intrinsic sensing elements which traditionally have been UV photo-inscribed into photosensitive Ge-doped silica fiber. Each FBG sensor has a characteristic retro-reflective Bragg resonance or Bragg wavelength, which is dependent upon the periodicity of the grating photo-inscribed within the fiber and the effective refractive index $n_{eff}$, of the fundamental core mode of the optical fiber. The FBG sensors can then easily be multiplexed in a serial fashion along a length of single fiber. When embedded into composite materials, optical fibers with an array of FBG sensors allow for distributed measurements of load, strain, temperature and vibration of the material creating what has is commonly referred to as "smart structures" where the health and integrity of the structure is monitored on a real-time basis.

Typically fiber Bragg gratings are fabricated using high powered UV-laser sources and a multi-step process which include:

1) Photosensitization of Ge-doped fiber by 'hydrogen-loading' taught by Atkins et al. in U.S. Pat. No. 5,287,427,
2) Cooling of the optical fiber to prevent de-photosensitization due to outgassing of hydrogen, for fiber storage,
3) Mounting the fiber into a writing system,
4) Connecting the fiber to an optical measurement system,
5) Removal of the UV-laser-absorbing protective polymer coatings of the optical fiber,
6) Inscription of the FBG by exposing the UV-photosensitive core of a germanium doped silica core optical fiber to a spatially modulated UV laser beam in order to create permanent refractive index changes in the fiber core. Such a spatially modulated UV beam can be created by using a two-beam interference technique as disclosed in U.S. Pat. No. 4,807,950 by Glenn et al. or by using a phase mask as disclosed in U.S. Pat. No. 5,367,588 by Hill et al. The techniques taught by Glenn and Hill result in gratings that are typically referred to as Type I gratings.
7) Collection and logging of data
8) Recoating of the stripped region of the optical fiber
9) Removal of the fiber from the writing system
10) Heating of the fiber and grating to outgas remaining hydrogen and stabilize the grating response by removing thermally unstable laser induced index change in the waveguide.

Several examples of prior art methods of automating some of these process steps are available. Novack et al. in U.S. Pat. No. 6,272,886 describes an automated optical fiber spool reel-to-reel FBG inscription system where a fiber under tension is translated through various stations that performing some of the multi-step processes listed above. Specifically a spooling apparatus under tension control pays out fiber, passes the fiber through a fiber stripping chamber; once stripped the fiber continues to a writing head where portions of the fiber still possessing a coating are clamped in front of a phase mask The fiber is then exposed to UV radiation from an excimer laser. Additional tension can be applied locally between these clamps in order to do limited tuning of the grating. After inscription the write head clamps release and the fiber is then translated to an annealing chamber. After annealing, the fiber is then translated to a fiber recoating station and coating cure chamber before it is received by the take-up spool. A schematic figure of the inscription system taught by the inventors of U.S. Pat. No. 6,272,886 is presented in FIG. 1 of this applications as an example of prior art.

Burt et al. in U.S. Pat. No. 6,522,808 describes a system for multiple writing stations whereby a beam from a single UV laser source is subdivided into separate beams and redirected to separate writing stations with jigging available to mount preprocessed optical fiber (stripped of its polymer coatings and hydrogen loaded). Beams can be manipulated to perform grating inscriptions separately. Afterwards, post processing of the fiber (recoating, annealing) are performed elsewhere. A serious limitation of this patent is that the time consuming and potentially degrading processes of fiber stripping and recoating are not solved.

Automated UV grating inscription systems require complex fiber handling because of the necessity to hydrogen loading, stripping/recoat fibers, post process annealing. U.S. Pat. Nos. 6,487,939, 6,503,327, and 6,532,327 assigned to 3M Innovations teach methods to strip and handle fibers for UV laser exposure by mounting the fibers in special cassettes; expose the cassette mounted fiber to a UV laser in order to inscribe a Bragg grating and then how the stripped fiber containing the grating can be recoated while remaining in the fiber management cassette.

Alternatively another automated FBG production line is taught by Lefebvre in a series of U.S. Pat. Nos. 6,778,741, 6,934,459 and 7,164,841 where a reel of optical fiber is unwound and mounted in a fiber support jig described in U.S. Pat. No. 6,778,741. The optical fiber photosensitized with hydrogen as taught by Atkins et al. in U.S. Pat. No. 5,287,427 is then transported to processing stations for the fibers stripping, exposure to the UV laser, and recoating.

A critical element of an automated FBG process relies on the precise alignment of the spatially modulated UV laser beam onto the fiber core. Komukai et al. in *IEEE Photonics Technology Letters* 8 (11) p. 1495 (1996) describe a method of inducing photoluminescence from GeO defects in a germanium doped optical fiber core using UV radiation. The amount of UV-generated 400 nm photoluminescence is proportional to amount of the spatially modulated UV laser beam that overlaps with the core of the Ge-doped optical fiber. Since the photoluminescence in the blue occurs at a longer wavelength (lower energy) than the UV absorption wavelength, it is often referred to as fluorescence. This photoluminescence can be guided by the core. By monitoring the level of this guided photoluminescence at the end face of the optical fiber the overlap of the UV beam with the fiber core can be determined. This UV beam/fiber core overlap can then be optimized through a feedback loop. By monitoring the UV induced photoluminescence in the fiber core through the fiber end face, Nishiki et al. in U.S. Pat. No. 5,914,207 teach a method of probing different sections of length of fiber with a UV beam in order to optimize fiber tilt. Lefevbre in U.S. Pat. No. 6,778,741 teaches a variation of this technique whereby the visible photoluminescence that is emitted radially from the irradiated core of the optical fiber, instead of that guided along the fiber core, is monitored by a detector placed adjacent to the exposure region of the fiber.

To bypass the necessity of stripping the optical fiber before UV grating inscription, Askins et al in U.S. Pat. No. 5,400,422 teach a method of inscribing gratings while the fiber is being pulled on the draw tower but before the fiber is coated. Using a holographic exposure set up and a single high energy UV pulse, a high reflectivity, high thermal stability damage grating or Type II grating can be written on the fly. A serious disadvantage of this approach is the necessity to have a fiber draw tower in order to manufacture an optical fiber grating or fiber grating array.

A limitation of these prior-art automation systems for FBG manufacturing based on UV lasers is that they rely on several processing steps that are time consuming and can potentially degrade the integrity of the optical fiber reducing the yield of the manufactured FBGs. They include the necessity to use Ge-doped optical fiber, to hydrogen load to increase fiber photosensitivity, to strip the fibers of their protective polymer coatings and then reapply them after FBG inscription. Mihailov et al. in U.S. Pat. Nos. 6,993,221 and 7,031,571 (both of which are herein incorporated by reference) teach methods of fabrication of FBGs using high power ultrafast pulse duration radiation and a phase mask. By using infrared femtosecond duration laser pulses, they teach that gratings can be written in the cores of non-UV photosensitive as well as photosensitive fibers directly through protective polymer coatings and without the necessity for hydrogen loading. It is not limited to specialty optical fibers but optical fibers that are readily available commercially. The mechanism by which index change is induced in the fiber is not one of linear absorption of high energy UV photons but nonlinear simultaneous absorption of lower energy infrared photons.

In the present application, references to "a permanent change in an index of refraction within a core of the optical waveguide" represents the formation of a grating that is stable at higher temperatures, for example at a temperature up to just below the glass transition temperature of the material forming the optical waveguide being inscribed with the grating. This is also referred to herein and in the art as a type II grating. In one embodiment, where the waveguide is a silica based fiber, a permanent change in an index of refraction within a core of the optical waveguide is one which is stable at temperatures of up to 1000° C. In other embodiments, where the optical waveguide comprises a different material (e.g. crystalline sapphire), the temperature may be higher than 1000° C.

In the present application, references to a "non-permanent grating" refer to gratings that are not stable to high temperatures, and that can be substantially removed by heating the optical waveguide. These are also referred to herein and in this field of art as type I gratings. In one embodiment, a non-permanent grating is one which is substantially removed by heating at temperatures of up to 1000° C. In some embodiments, the non-permanent gratings are substantially erased at temperatures lower than 1000° C., for example 800 C It is an object of this disclosure to overcome the aforementioned limitations within the prior art systems for automated fabrication of fiber Bragg gratings by presenting methods and a system for automated FBG inscription that utilizes but is not limit to femtosecond pulse duration infrared lasers.

SUMMARY

In one aspect, there is provided an alignment system for use in an ultrashort pulse duration laser-based Fiber Bragg Grating (FBG) writing system, the electromagnetic radiation having a pulse duration of less than or equal to 5 picoseconds, and the wavelength of the electromagnetic radiation having a characteristic wavelength in the wavelength range from 150 nm to 3.0 microns; the alignment system comprising: a holder configured to hold an optical fiber in a position perpendicular to a beam path of an ultrashort pulse duration laser-based FBG writing station; an optical detector; and a control system with an input from the optical detector and an output to adjust parameters of an optical writing source and the FBG writing station based on photoluminescence generated in the optical fiber as indicated in a signal received at the input from the optical detector.

Ultrashort is to be understood as less than or equal to 5 picoseconds.

In some embodiments, the wavelength range is from 150 nm to 2.0 microns.

In an embodiment, the optical fiber is coated.

In an embodiment, an external light source is coupled into the core of the optical fiber In an embodiment, the optical detector is positioned to visualize/image ultrashort pulse duration laser induced modification in the optical fiber based on collecting a scattered component of the light that is coupled into the optical fiber using the external source In an embodiment, the parameters are adjusted based on photoluminescence generated in a core of the optical fiber, In an embodiment, the parameters are adjusted based on photoluminescence generated in cladding of the optical fiber.

In an embodiment, the parameters comprise at least one of: chirping a compressor of a regenerative amplifier of a writing source; polarization of the writing source; alignment of a phase mask in terms of rotation, tilt, distance to fiber; alignment of the optical fiber in terms of its distance from a focus, distance from the phase mask, tilt of the fiber with respect to a cylindrical focus of a writing beam; and if the optical fiber is a sapphire fiber with an hexagonal cross section, or a polarization maintaining D-shaped fiber or photonic crystal fiber with air holes along the fiber axis, fiber rotation.

In an embodiment, the ultrashort pulse duration laser-based FBG writing station generates IR pulses.

In an embodiment, the ultrashort pulse duration laser-based FBG writing station generates femtosecond duration laser pulses.

In an embodiment, the optical detector is positioned to detect non-linear induced photoluminescence in the fiber axially.

In an embodiment, the optical detector is positioned to detect non-linear induced photoluminescence in the fiber transversally.

In an embodiment, the photoluminescence monitored comprises non-linear photoluminescence.

In an embodiment, the photoluminescence monitored comprises 460 nm photoluminescence.

In an embodiment, the photoluminescence monitored comprises 650 nm photoluminescence.

In an embodiment, the luminescence monitored comprises 400 nm photoluminescence.

In an embodiment, the photoluminescence monitored comprises 410 nm photoluminescence.

In an embodiment, the photoluminescence monitored comprises 413 nm photoluminescence.

In an embodiment, the fiber is a non-Ge doped fiber.

In an embodiment, the fiber is a pure silica core fiber.

In an embodiment, the fiber comprises active dopants.

In an embodiment, the fiber is an actively doped fiber used for fiber lasers

In an embodiment, wherein the optical fiber comprises a core section and a cladding section, and the control system monitors a photoluminescence pattern within the fiber cladding, the fiber core, or both.

In an embodiment, the optical detector is positioned to visualize/image ultrashort pulse duration laser induced modification in the core of the optical fiber based on collecting a scattered component of the light that is coupled into the fiber core using an external source.

In an embodiment, the external optical source is selected from the group consisting of a CW (Continuous Wave) light source, and visible light source.

In another aspect, there is provided a method of aligning an ultrashort pulse duration laser-based Fiber Bragg Grating (FBG) writing system, the method comprising: holding an optical fiber in a position perpendicular to a beam path of an ultrashort pulse duration laser-based FBG writing station; positioning an optical detector proximate to the fiber; generating an ultrashort laser pulse with the ultrashort writing station; monitoring with a control system a signal from the optical detector representing photoluminescence generated in a core of the optical fiber; and adjusting parameters of the ultrashort laser writing optical source and the FBG writing station based on photoluminescence generated in the optical fiber as indicated in a signal received at an input from the optical detector.

In an embodiment, the photoluminescence generated in the optical fiber is delivered to the detector through the optical fiber.

In an embodiment, the photoluminescence generated in the optical fiber is delivered to the detector through an optical imaging system.

In an embodiment, the method further comprises detecting non-linear induced photoluminescence in the fiber axially.

In an embodiment, the method further comprises detecting non-linear induced photoluminescence in the fiber transversally.

In an embodiment, the method further comprises detecting monitoring non-linear photoluminescence.

In an embodiment, the method further comprises detecting monitoring 400 nm, 410 nm, 413, 460 nm or 650 nm photoluminescence.

In an embodiment, the method further comprises detecting monitoring light scattered from the laser induced modification in the core of the fiber.

In another aspect, there is provided a method whereby temporally chirping the femtosecond pulse duration inscription pulse after optical alignment has been achieved produces Type II gratings inscribed through the protective polymer coating are stable approaching the glass transition temperature of the waveguide. The removal of these process steps allows for the realization of a truly automated FBG inscription system for harsh environment distributed sensor arrays.

BRIEF DESCRIPTION OF FIGURES

FIG. 2C depicts a beam division scheme comprising shutters and beam splitters.

FIG. 3 depicts the individual beam manipulation and imaging optics before the FBG writing stations that control beam intensity and divergence.

FIGS. 10A and 10B present data on wavelength shift of the Type II fiber Bragg gratings with temperature.

DETAILED DESCRIPTION

Figure 1:
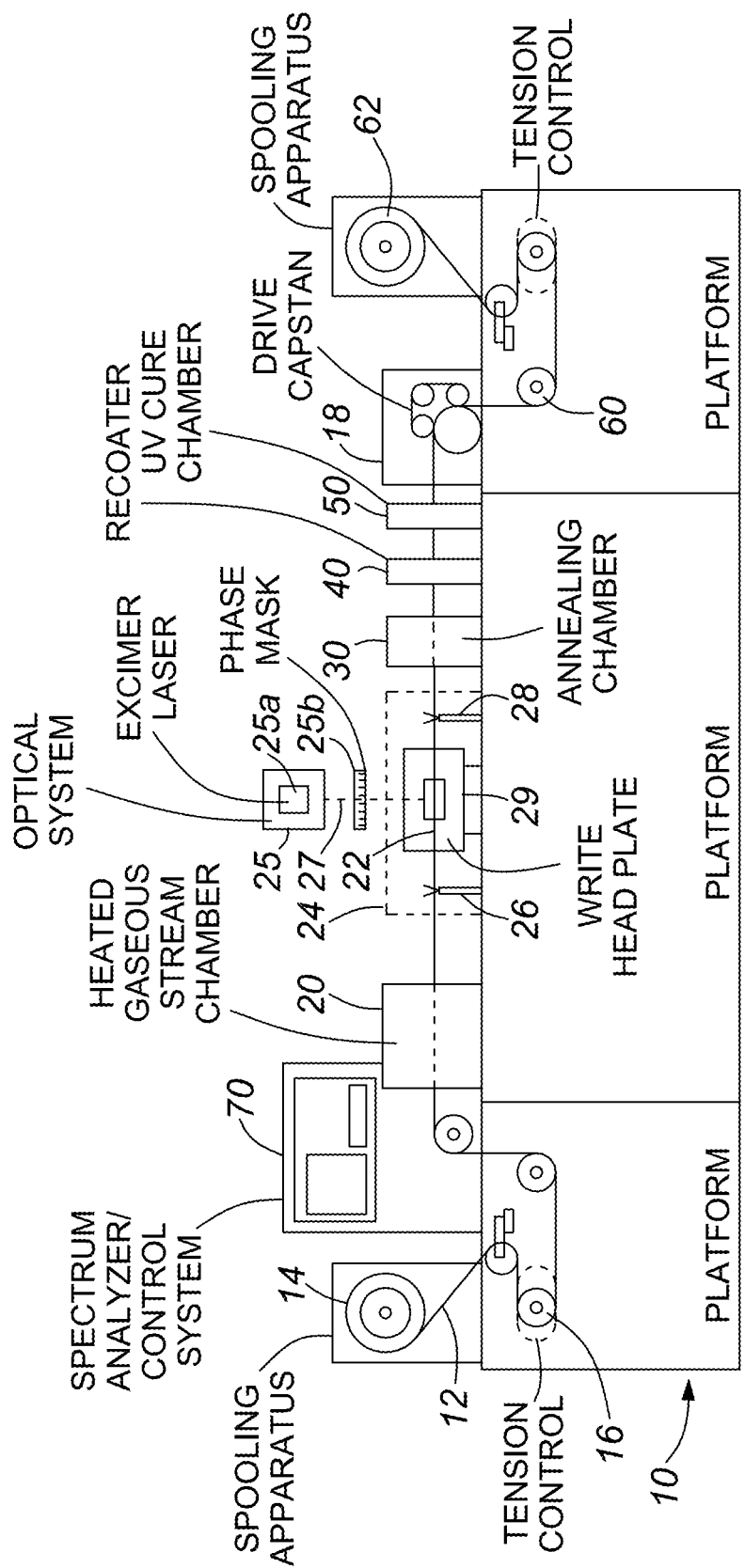
FIG. 1 depicts the prior art approach for automated fiber Bragg grating inscription with an UV laser and a phase mask as taught by Novack et al. in U.S. Pat. No. 6,272,886.

For traditional FBG manufacturing based on high powered UV laser systems, the protective polymer jacket is typically highly absorbing in the UV which necessitates the removal of the jacket prior to writing the FBG and its reapplication after the inscription. These important processing steps are included in the automated FBG manufacturing system taught by Novack et al. in U.S. Pat. No. 6,272,886. Referring to FIG. 1 as an example of prior art the system of Novack et al includes the heated gaseous chamber 20 to strip the optical fiber, the recoating station comprising the recoater 40 and the UV cure chamber 50 to polymerize the newly applied coating. Furthermore, to write Bragg gratings in standard Ge-doped silica telecommunication fiber, the fiber needs to be photosensitized to the UV radiation by the high pressure hydrogen gas loading technique taught by Askins et al in U.S. Pat. No. 5,287,427. Unless refrigerated to temperatures of −40° C., the hydrogen loaded fiber immediately starts to out-gas its content of hydrogen when the fiber is no longer pressurized in an $H_2$ atmosphere. As the increase in Ge-doped fiber photosensitivity is proportional to hydrogen content in the fiber, the continued out-gassing decreases the fiber's photosensitivity to UV radiation with time. Refrigeration of the system taught in U.S. Pat. No. 6,272,886 is not practical. Instead UV dosages during grating inscription are varied as a function of out-gassing time of the fiber. After inscription, the fiber grating is annealed in the annealing chamber 30 to accelerate the out-gassing from the fiber of the remaining hydrogen as well as to remove weakly induced index change which erases with increasing temperature.

A distinct advantage of using femtosecond pulse duration lasers operating at wavelengths that are transparent to the protective polymer jackets that coat manufactured optical fiber is that fiber Bragg gratings can be inscribed without the processing steps of optical fiber stripping and recoating. These process steps typically degrade the optical fiber reducing mechanical integrity and reducing manufacturing yield. Furthermore fibers needing photosensitivity to UV radiation either by specialty doping of the core or hydrogen loading are not required. This removes two more limitations of the standard UV inscription process of hydrogen loading or specialty optical fiber. Advantageously, standard optical fiber with standard optical coatings that are commercially available could be used.

As an example, arrays of fiber grating sensors could be manufactured in pure silica core optical fibers that are coated with thermally stable polymers such as polyimide. For optical fiber-based downhole pressure and temperature monitoring in the oil and gas sector, standard Ge-doped telecom fibers suffer from hydrogen induced fiber darkening which can severely limit the lifetime of the sensor. Pure silica core fibers suffer significantly less from hydrogen induced attenuation loss, however it is extremely difficult to manufacture FBGs in pure silica core fibers with UV laser sources and it is impossible to do so without removing the protective polyimide optical fiber coating. Using the techniques taught by Mihailov et al in U.S. Pat. No. 7,031,571, Bernier et al demonstrated in Opt. Lett. 39 (12), 3646 (2014) that gratings could be written though the polyimide coatings of pure silica core optical fibers.

Femtosecond pulse duration regeneratively amplified Ti:sapphire laser systems are becoming laser machining sources with reliability levels needed for industry. With millijoule (mJ) scale pulse energies and commercially available pulse durations of >35 femtoseconds (fs) significant peak intensities in the gigawatts/cm$^2$ can be generated. The inventors have discovered that for trans-jacket inscription, where trans jacket refers to Bragg grating inscription through protective polymer coatings of fibers, pulse energies with only tens of microjoules (μJ) are sufficient to inscribe a grating through the protective polymer coating when proper focusing optics correcting for spherical aberration are utilized. With such low pulse energies possible for trans jacket inscription and the expense of a regeneratively amplified laser source, it is possible and desirable to multiplex an individual source beam into several writing beams that couple into several fiber Bragg grating fabrication stations. Because regeneratively amplified Ti:sapphire laser systems can have pulse repetition rates in the kHz range, multiplexing can be arrived at either through beam splitting or by beam redirection depending on pulse number. Although the following exemplary description is given in terms of femtosecond pulses in the infrared wavelength regime, it is easily applied using other femtosecond laser wavelengths in the visible or ultraviolet wavelength ranges.

Figure 2A:
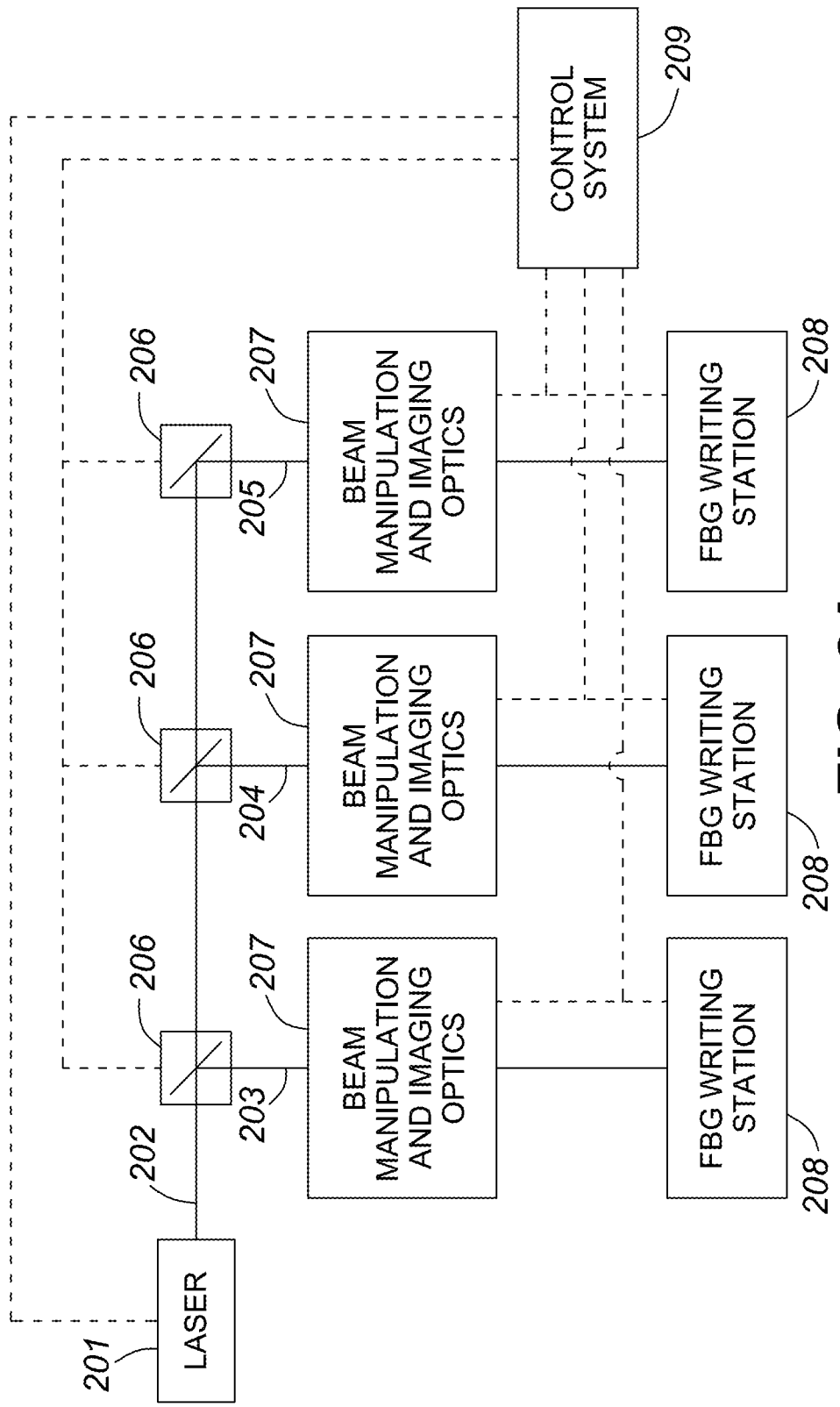
FIG. 2A depicts a system containing multiple fiber Bragg grating writing stations utilizing a single ultrashort pulse duration laser beam that is divided between the writing stations.

FIG. 2A presents a schematic on how a regeneratively amplified femtosecond pulse duration source 201 that generates a femtosecond pulse duration beam 202 can be divided into, as an example, three sub-beams 203, 204, and 205 using beam division optics 206. Each sub-beam is redirected to beam manipulation and imaging optics 207 which can attenuate or expand the beam, or change the beam divergence in order to vary the pitch of the resultant grating as taught by Mihailov et al in the Patent Cooperation Treaty application PCT/CA2015/000429. The processed beam then enters the FBG writing station 208. All components 201, 206, 207 and 208 are controlled by central control system 209.

An important consideration for this multiplexing approach is the type of beam division optics employed in splitting the beam. Burt et al. in U.S. Pat. No. 6,552,808 teach the use of dielectric stack beam splitters which will subdivide the beam into multiple beam lines, each splitter creating two sub-beams. An issue with this approach when using ultrashort (less than or equal to 5 picoseconds) optical pulses is that the substrate of the beam splitter through which one of the two generated beams will pass, will introduce dispersion which will increase the pulse duration of the beam. Concatenation of a significant number of beam division splitters 206 could introduce significant dispersion in the final sub-beams significantly increasing their pulse durations and altering the efficiency of the FBG inscription process. As the process for induction of index change is highly nonlinear, changing the pulse duration of the writing beam can have significant impacts on the writing process. If the pulse duration of the beam is longer than 100 fs, then significant lengthening of the pulse does not occur, in which case the partial beam splitters can be optimized such that the energy coupled into each of the sub beams is the same.

Figure 2B:
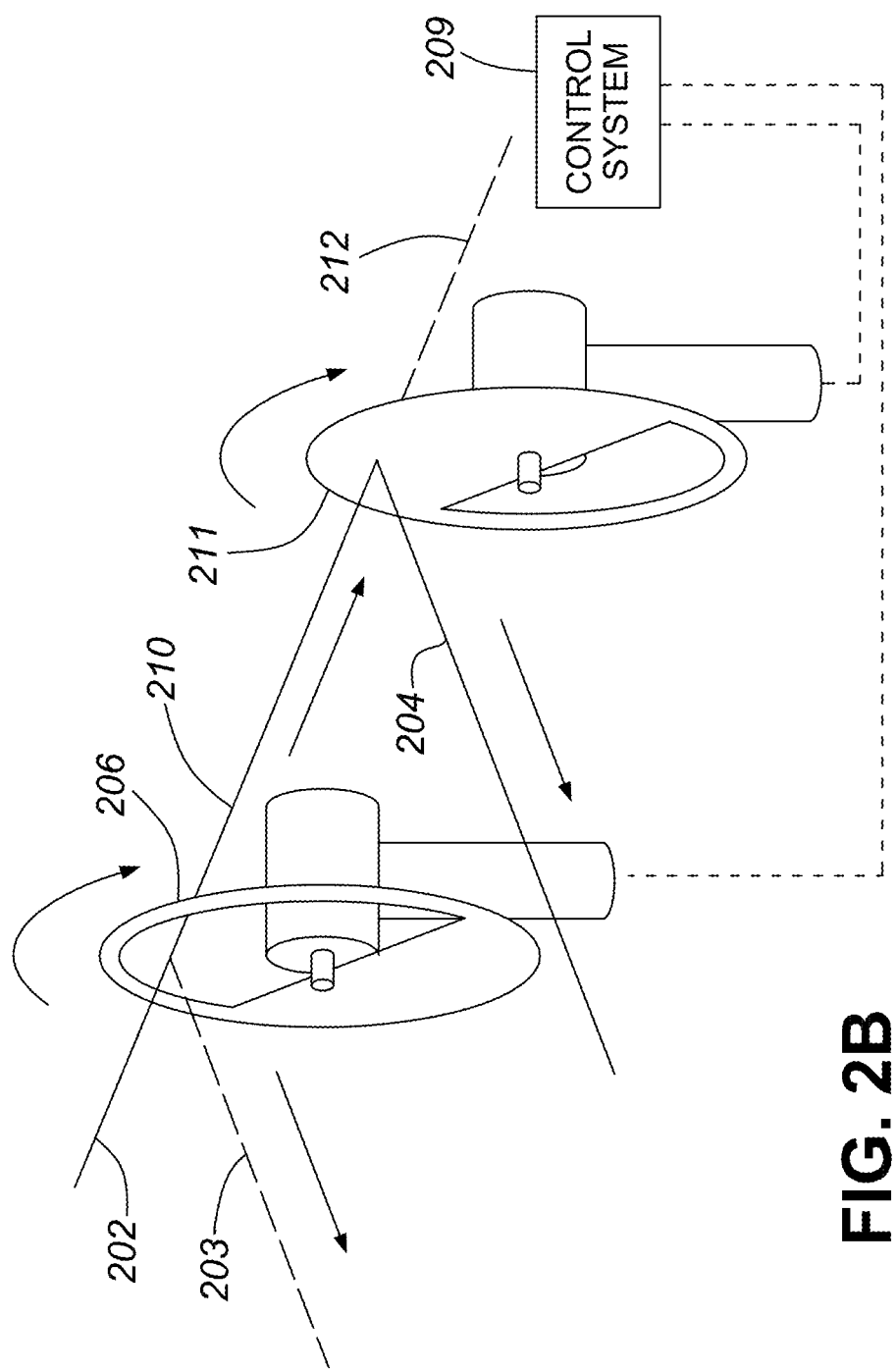
FIG. 2B depicts a beam division scheme utilizing a reflecting mirror with an aperture on a 'chopper' wheel.

In FIG. 2B a scheme for beam division is presented where the division optical elements 206 and 211 are based on a mirrored chopper wheel. The chopper wheel is designed to have a mirrored surface with an aperture which will allows the incident beam 202 to either pass through 210 or be reflected 203 by the wheel depending on the frequency of rotation of the wheel with respect to the pulse repetition rate of the source laser. For example if the incident beam 202 is pulsed at a repetition rate of 1 kHz and the chopper wheel is initially oriented such that beam 202 is passing through the aperture but the control system 209 sets the speed of rotation of the wheel to be 1 kHz, then the beam 202 will always pass through the first division optic element 206. If however the controller 209 sets the speed rotation at 500 Hz, then the first incident pulse 202 becomes a transmitted pulse 210 while the second pulse becomes a reflected pulse 203 which couples into the beam manipulation and imaging optics 207. If the control system 209 sets the rotation speed of the second division optic element 211 at 250 Hz, then the beam is further subdivided into a transmitted beam 212 and a reflected beam 204. The advantage of this approach is that pulse energy ultimately incident on each of the FBG writing stations 208 is preserved. However the repetition rate of the beams ultimately incident on individual writing stations is reduced and varied unless additional shutters are place on the beams 203, 204 and 205 to equate the repetition rates entering the beam manipulation and imaging optics.

An alternative approach for beam division is presented in FIG. 2C. In this instance, the beam division optics comprise a device 213 for rotating the state of polarization of incident beam 202, such as a rotatable half-wave plate or a Pockel cell, and a polarization beam splitter 214. The incident beam 202 has a state of S-polarization 215. Thin film polarizers or polarizers oriented at the Brewster angle, will reflect beams with S-polarization 215 but will transmit beams with P-polarization 216. Using device 213, the control system 209 can rotate the S-polarization state of beam 202 to P-polarization in which case the polarized beam splitter 214 will transmit beam 202 rather than reflect it into sub-beam 203. In order to ensure that the two output beams 203 and 204 have experienced the same amount of dispersion, a dispersion equalization plate 219 is added to the beam path 203 after the beam splitter 214. The transmitted P-polarization beam is then incident on a second rotating polarization device 217 identical to 213 which can then return the beam to its original S-polarization state so that it can be reflected by a second polarizing beam splitter 218 into reflected sub-beam 204. Additional dispersion equalization plates are added for each additional beam line added to the system.

FIG. 3 is a schematic diagram describing the beam manipulation and imaging optics 207 which contain automated systems for varying the beam energy, divergence and collimation. One of the polarized sub-beams 301 that was generated by the beam division optics 206, enters the system. Beam attenuation is varied by a beam attenuator 302 that is controlled by the control system 209. The beam attenuator can be a variable attenuator such as a neutral density variable attenuator wheel or the combination of half-wave plate and polarizer. The beam is then passed through a low reflectivity beam splitter 303, for example a fused silica window. The reflected signal is then directed into a detector 304 which then transmits a feedback signal to the control unit so that the energy of the beam passing through the attenuator can be controlled. If no beam collimation or beam divergence manipulation is required, the beam 301 continues to a turning mirror 305 that directs the beam to a retractable mirror 306 which is controlled by the control system 209 such that the mirror is positioned at 306A in order to direct beam 301 into the FBG writing station 208. If instead the beam is to be expanded, then the final turning mirror 306 is retracted and turning mirror 307 is inserted into position 307A to redirect the beam 301 via the turning mirror 308 into the beam expander 309. The apparatus 309 is a cylindrical telescope, which includes a concave cylindrical lens 310 and a convex cylindrical lens 311. The concave cylindrical lens 310 has negative optical power, or defocusing power, in the YZ plane (coordinate system 312). The convex cylindrical lens 311 has positive optical power, or focusing power, in the YZ plane. In operation, the concave cylindrical lens 310 increases divergence of a "first" optical beam 301 entering the system 207, forming a diverging optical beam 313. The convex cylindrical lens 311 is disposed in an optical path of the diverging optical beam 313 downstream the concave cylindrical lens 310. The convex cylindrical lens 311 receives the diverging optical beam 313 and decreases the divergence of the diverging optical beam 313, forming a "second" optical beam 314. Herein and throughout the rest of the specification, the terms "first", "second", and the like do not imply an order of elements. Rather, they are merely used as identifiers. A telescope support 315 is provided for supporting the concave 310 and convex 311 cylindrical lenses of the beam expander 309. The telescope support 315 includes a movable portion 316 supporting the concave cylindrical lens 310, for adjusting a distance/between the concave 310 and convex 311 cylindrical lenses along a direction 317 parallel to the Z axis, thereby adjusting a divergence of the second optical beam 314. In one embodiment, the movable portion 316 may support the convex cylindrical lens 311, and the concave cylindrical lens 310 may be fixed to the telescope support 315. At least one of, or both the concave 310 and convex 311 cylindrical lenses may be mounted on a movable support member or members, such as the movable portion 316, to vary the distance l between the concave 310 and convex 311 cylindrical lenses of the beam expander 309.

When the concave cylindrical lens 310 is at a position 310A shown with dotted lines, l>f1+f2, where f1 and f2 are the focal lengths of the concave and convex cylindrical lenses 310 and 311, respectively, the second optical beam 314 exiting the beam expander 309 at the convex cylindrical lens 311 is converging as shown with dotted lines 314A, and has a positive effective focal length $f_{eff}$. When the foci or focal points of the concave 310 and convex 311 cylindrical lenses overlap spatially, l=f1+f2, the second optical beam 314 exiting the beam expander 309 is collimated as shown with solid lines 314B. When the concave cylindrical lens 310 is at a position 310C shown with dashed lines, l>f1+f2, the second optical beam 314 exiting the beam expander 309 at the convex cylindrical lens 311 is diverging as shown with dashed lines 314C. As disclosed by Mihailov et al. in PCT/CA2015/000429, it is advantageous to control the divergence of the beam entering the phase mask contained within the FBG writing station 208 as the grating pitch hence the resonant wavelength of the Bragg grating can be altered. By adjusting the distance/between the concave 310 and convex 311 cylindrical lenses, one may tune the grating period to compensate for manufacturing or design variations. In this fashion only the Y-axis dimension of the input beam 301 is modified resulting in a cylindrical rather than a spherical expansion 314 of the input beam 301. Large changes can be made to manufacture gratings with different specifications. Furthermore, one grating may be written over another with differing resonance wavelength but with the same phase mask. Such multi-wavelength gratings can be particularly useful in compound sensors. Grating chirp may also be controlled to provide a more complex spectral response.

Figure 4:
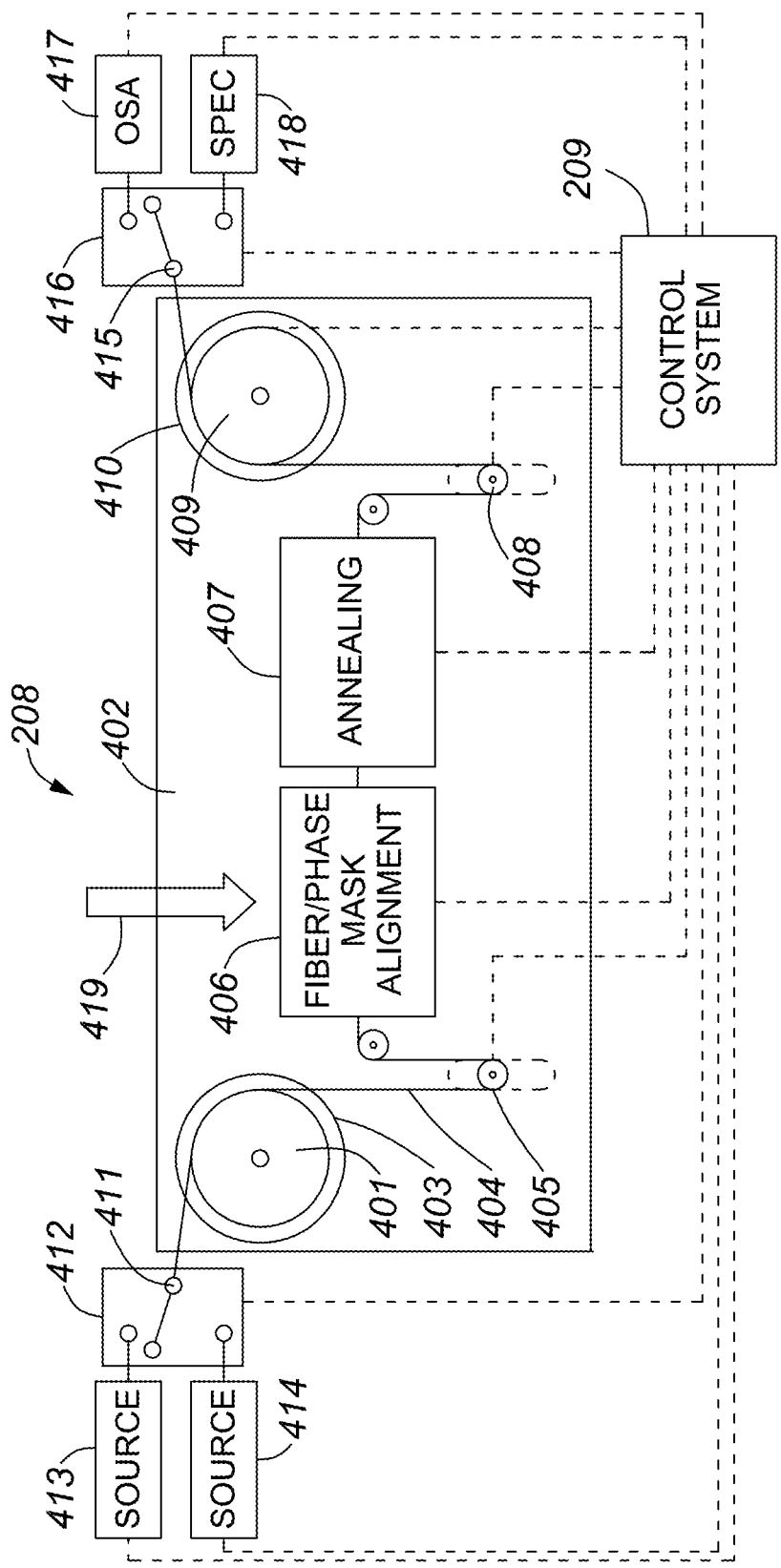
FIG. 4 depicts individual FBG writing stations which comprise fiber handling and monitoring, fiber/mask alignment and inscription, and annealing.

FIG. 4 is a schematic diagram describing the FBG writing station 208 into which the beam processed by the beam manipulation and imaging optics 207 is directed. The FBG writing station 208 comprises fiber handling, sources and detectors for FBG device qualification and measurement, and an FBG writing head comprising components for FBG inscription with the input beam from the beam manipulation and imaging optics 207. Firstly a spool of polymer coated optical fiber 401 is placed on a spooling apparatus 402 with a first mandrel 403. Pay out fiber 404 is then fed through the FBG writing station 208 passing a first tension control unit 405, the FBG writing head 406, an annealing station 407, a second fiber tension control unit 408, onto a take-up spool 409 that is mounted on a drive mandrel 410. The tensioning, payout and take-up of the fiber is controlled by the control system 209. Once mounted, the input end 411 of the optical fiber 404 is connected to a first 1×2 optical switch 412 that is connected to two optical sources and is controlled by the control system 209. The first optical source 413 is used to interrogate the fiber and Bragg grating during fabrication. The second source 414 is a high powered optical source with a wavelength that is strongly absorbing by the core of the optical fiber. Such a source can be used for inline annealing of the Bragg grating removing the necessity of an annealing station 407. The output end 415 of the optical fiber 404 is connected to a second 1×2 optical switch 416 that is connected to two optical detectors that are monitored by the control system 209. The first detector 417 monitors the spectrum of the fiber Bragg grating during its inscription using light from the source 413. Typically this detector is an optical spectrum analyzer when the source 413 is a broadband white light source. The second detector 418 can be a spectrometer which monitors the photo luminescence that is generated by 800 nm femtosecond pulsed beam 419 relayed from the beam manipulation and imaging optics 207 that interact with the core of the optical fiber 404 within the FBG writing head 406.

Under control of the control system 209, the spooling apparatus 402 pays out a portion of the fiber under tension control to the FBG writing head 406 where the FBG is inscribed. After writing, the drive mandrel 410 translates the portion of the fiber containing the Bragg grating into the annealing station 407 where the temperature of the grating is elevated in order to remove thermally unstable portions of the induced index change of the grating. The fiber portion containing the grating is then drawn into the take-up spool 409.

Figure 5:
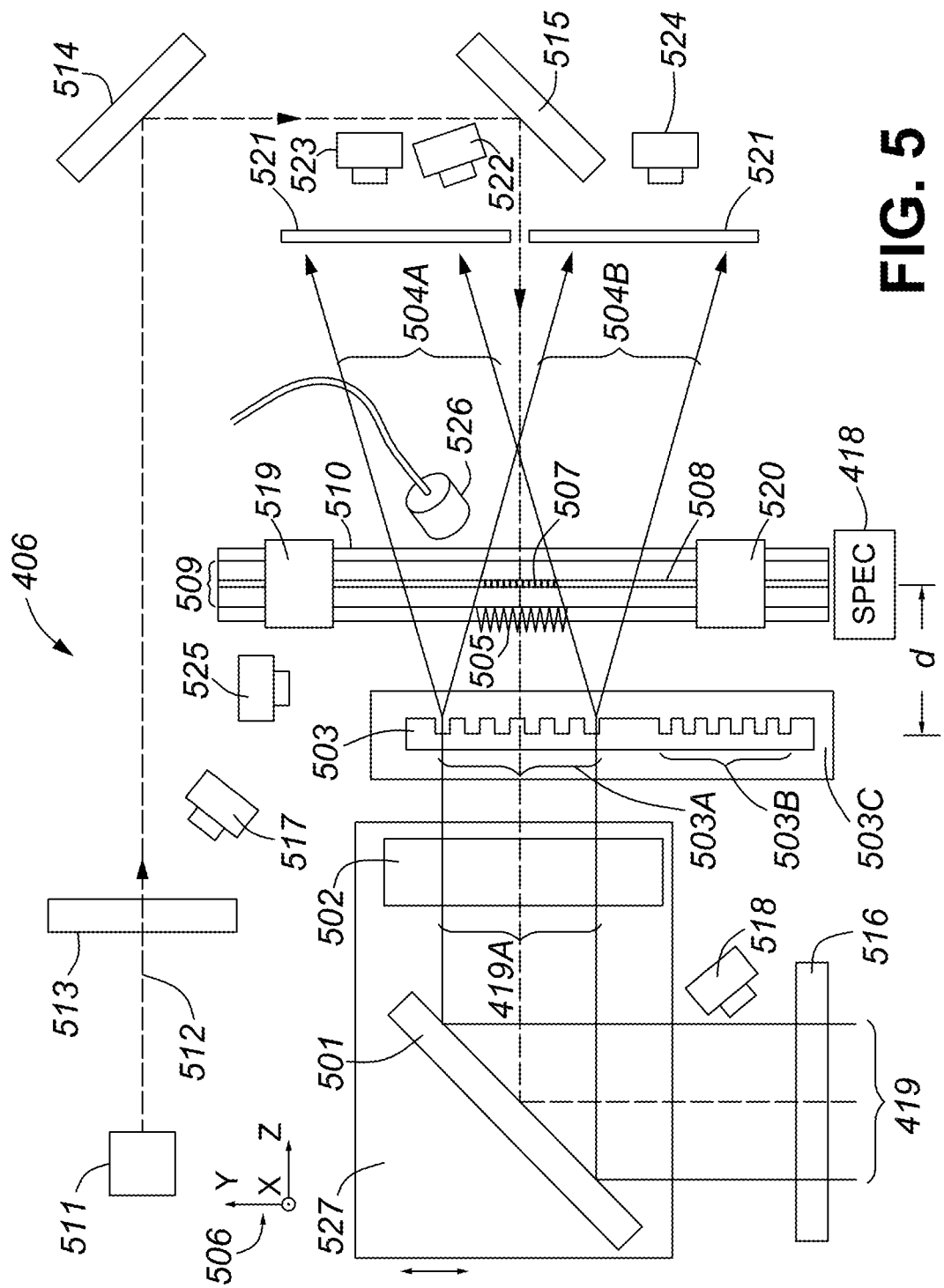
FIG. 5 depicts a detailed schematic of the fiber/mask alignment and inscription stage of the FBG writing station.

FIG. 5 is a schematic diagram describing the FBG writing head apparatus 406. The 800 nm femtosecond pulsed beam 419 relayed from the beam manipulation and imaging optics 207 enters the writing apparatus 406 and is redirect by a turning mirror 501 through a cylindrical lens 502 and phase mask 503 to generate two sub-beams 504A and 504B. Typically these two sub-beams are the +1 and −1 diffracted orders generated by the phase mask. Although other diffracted orders may be generated by the phase mask, by employing the techniques taught by Mihailov et al. in U.S. Pat. No. 7,031,571, only the +1 and −1 diffracted orders interfere to produce an intensity-modulated interference pattern 505. This interference pattern is focused by the cylindrical lens 502 into a line focus parallel to the Y axis of the XYZ co-ordinate system 506. The interference pattern 505 generates the index modulation 507 in the core 508 of the optical fiber 509 that comprises the fiber Bragg grating.

For trans jacket FBG inscription, there are a number of factors which need to be taken into consideration. In order to maximize the differential in the beam intensity experienced in the fiber core 508 as compared to the intensity experience by the fiber coating 510, the cylindrical lens 502 must have a focal length as short as possible. Short focal length lenses typically suffer from aberrations which limit the minimal focal spot size of the interfered beams. In order to achieve a tighter or narrower line focus, acylindrical lenses which correct for aberrations need to be used.

The phase mask 503 used in the system can have a number of phase mask structures etched into the single substrate, for example mask patterns 503A and 503B that produce different Bragg resonances $\lambda_{Br}$. The phase mask is mounted on a translation stage 503C that disposes the appropriate mask pattern in front of the femtosecond beam 419A. The stage is controlled by the central controller unit 209. In order to maximize the reflectivity from the Bragg grating, it is advantageous that the grating structure produce a fundamental Bragg resonance where the Bragg resonance $\lambda_{Br}=2 n_{eff}\Lambda$ and $n_{eff}$ is the effective index of the guided mode and $\Lambda$ is the pitch of the Bragg grating 507. When using the techniques taught by Mihailov et al. in U.S. Pat. No. 7,031,571, $\Lambda$ is half the pitch of the phase mask when the phase mask is placed a distance d from the fiber.

For FBG inscription, it is critical that the cylindrical lens 502, phase mask 503 and the axis of the optical fiber 509 be normal to the incident femtosecond pulsed beam 419A relayed by the turning mirror 501 which in FIG. 5 is along the Z-axis. The cylindrical lens 502 and phase mask 503 each require 6 axes of travel for alignment (X-direction, Y-direction, Z-direction, tilt in the XY, YZ and XZ planes) to ensure these components are at normal incidence to the femtosecond pulse. Coarse alignment is achieved by utilizing a continuous wave laser source 511 which generates a beam 512 that counter propagates along the beam path defined by the femtosecond pulse duration beam. Cylindrical lens 502, phase mask 503 and optical fiber 509 are retracted from the beam path by control system 209. Counter propagation of beam 512 is achieved by passing 512 through a pinhole 513 and two turning mirrors 514 and 515 aligning components along the optical axis defined by the femtosecond pulse duration beam entering the apparatus through an iris/shutter 516. The iris/shutter 516 is apertured down to a pinhole and centered on the femtosecond beam 419. In the absence of optical elements 502, 503 and 509 the beam path of both the femtosecond beam 419 and the alignment beam 512 are adjusted using turning mirrors 514 and 515 to ensure both 419 and 512 pass through the pinhole 513 and the closed iris 516. Camera 517 is used to inspect the image of the femtosecond beam 419 through the pinhole 513 while camera 518 is used to observe alignment of beam 512 through the iris 516.

Once the two beams 419 and 512 are co-linear and counter propagating, the optical fiber 509 is introduced into the beam path. Before alignment, the drive mandrel 410 pulls payout fiber 404 into the FBG writing head 406. Within the writing head, fiber clamps 519 and 520 close to hold the optical fiber in place. Fiber clamps 519 and 520 are mounted on stages with 3 axis of travel. Together the two stages deliver 6 axis of alignment to the fiber. The optical fiber 509 is placed in the beam path of 419 such that the fiber core 508 is centered on the apertured beam 419. The cylindrical lens 502 is then introduced into the beam path. Retroreflections of the alignment beam 512 from the front and back surfaces of 502 return along the beam path and irradiate the pinhole 513. The control system 209 adjusts 5 of the 6 axis of alignment of the lens 502, with the exception of the Z-axis, in a feedback loop by monitoring information from camera 517 to ensure that the retroflected beams are passing through the pinhole 513 ensuring that the lens 502 is perpendicular to the alignment beam 512. The position of the cylindrical lens 502 is adjusted along the X-axis so that the shadow in the alignment beam 512 cast by the fiber 509 is centered on iris pinhole 516. The IR beam 419 is then attenuated to approximately 1% of the pulse energy needed for grating inscription by the beam attenuator 302 within the beam manipulation and imaging optics 207. The iris 516 is then opened to allow full transmission of the IR beam without being apertured or clipped. The beam 419A is then used to perform a fine alignment the lens 502 (rotation and tilt) with respect to the fiber 508 using the fiber axis as a reference, by monitoring the screen 521 which is sensitive to infrared radiation using a viewing camera 522. The screen 521 has an aperture to allow transmission of the alignment beam 512.

The phase mask 503 is then placed in the beam path and aligned to be perpendicular to the alignment beam 512 in a process similar to that of the lens 502. The tilt of the phase mask with respect to the fiber axis is achieved by superposing the generated +1 and −1 diffracted order sub-beams 504A and 504B at the screen 521 with the line formed by the reflected alignment beam 512 off of the phase mask 503.

Figure 6:
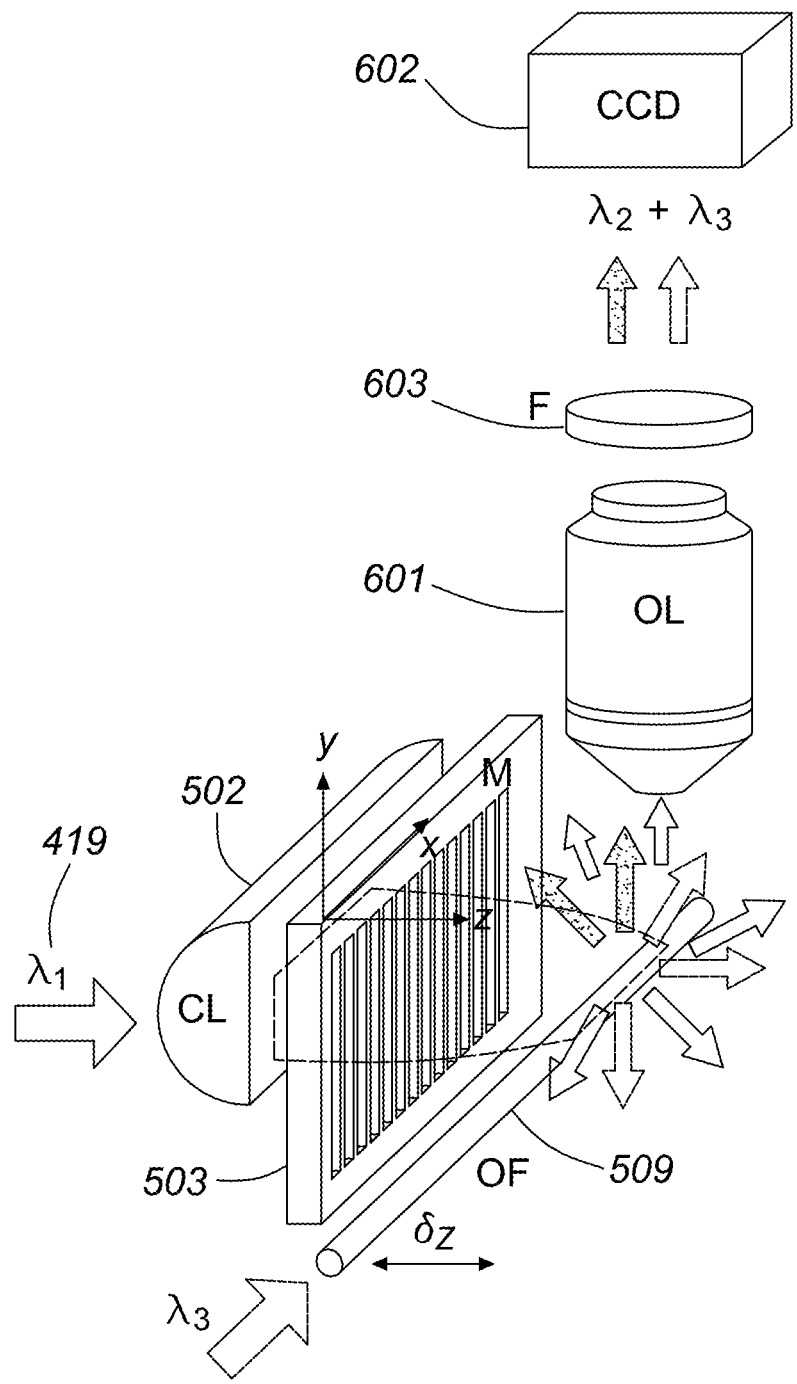
FIG. 6 depicts a detailed schematic of the fiber/mask alignment and inscription stage of the FBG writing station.
Figure 7A:
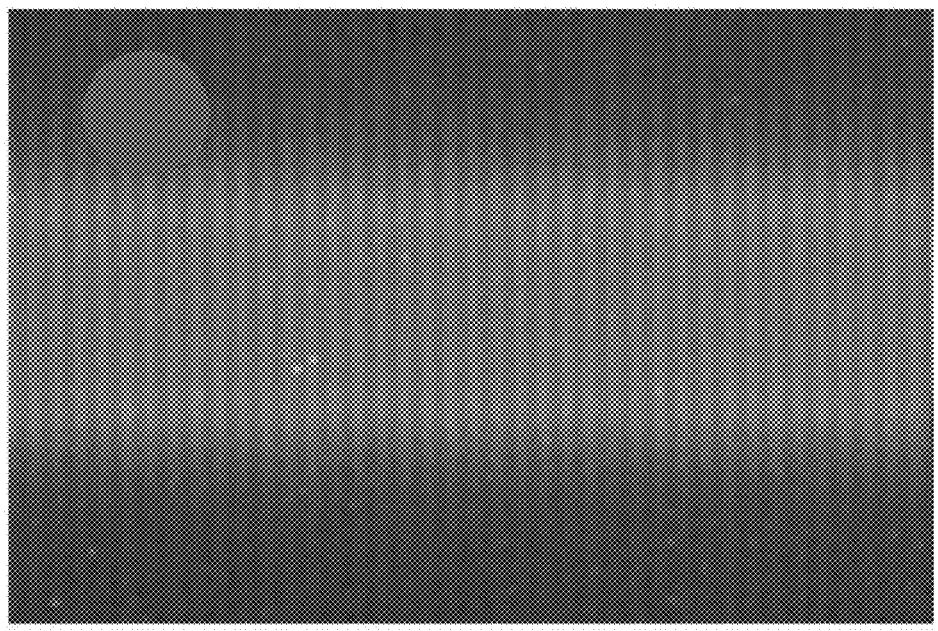
FIGS. 7A to 7F present images of photoluminescence measurements during fiber-phase mask distance positioning as an aid to alignment.
Figure 7B:
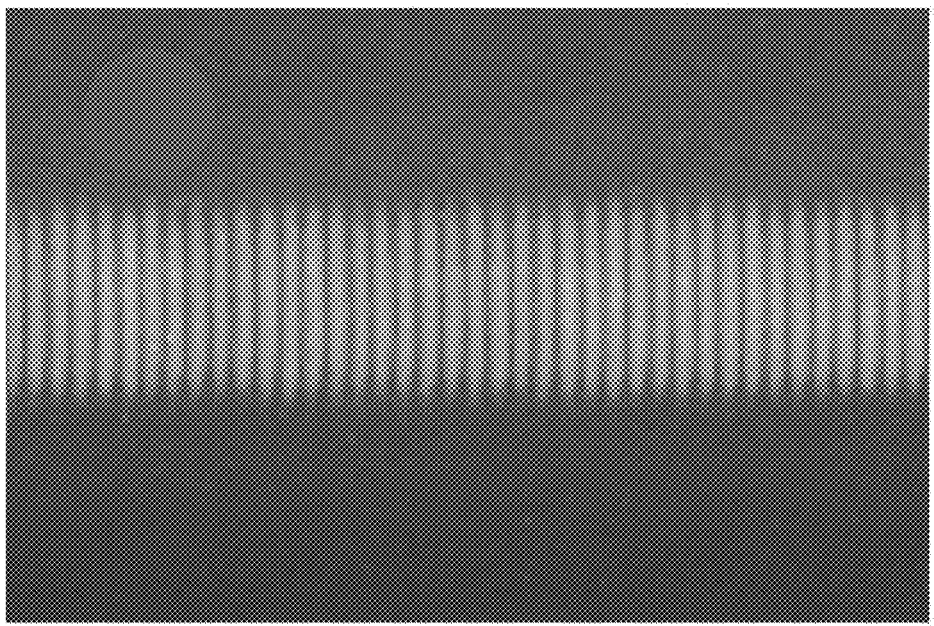
Figure 7C:
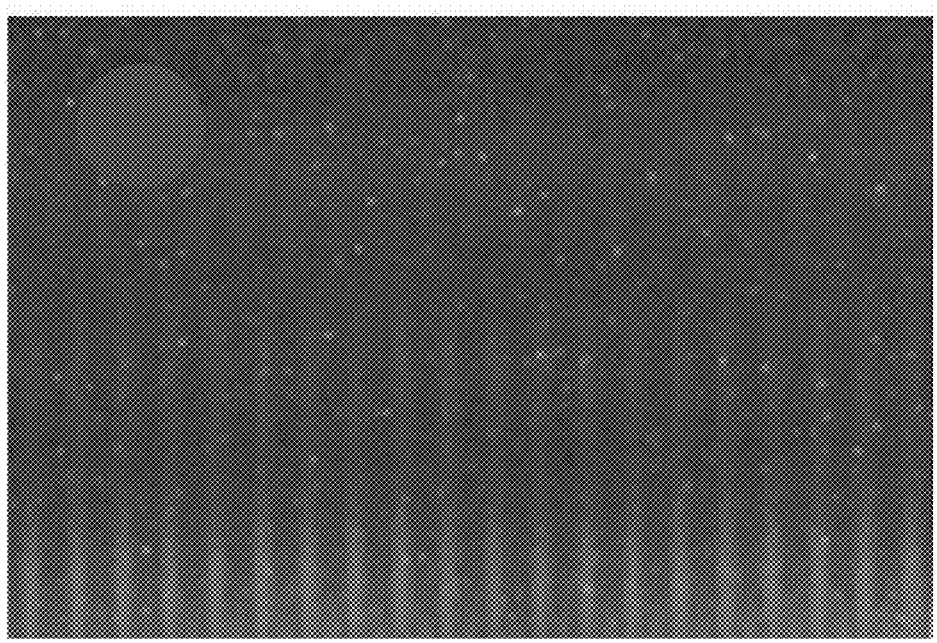
Figure 7D:
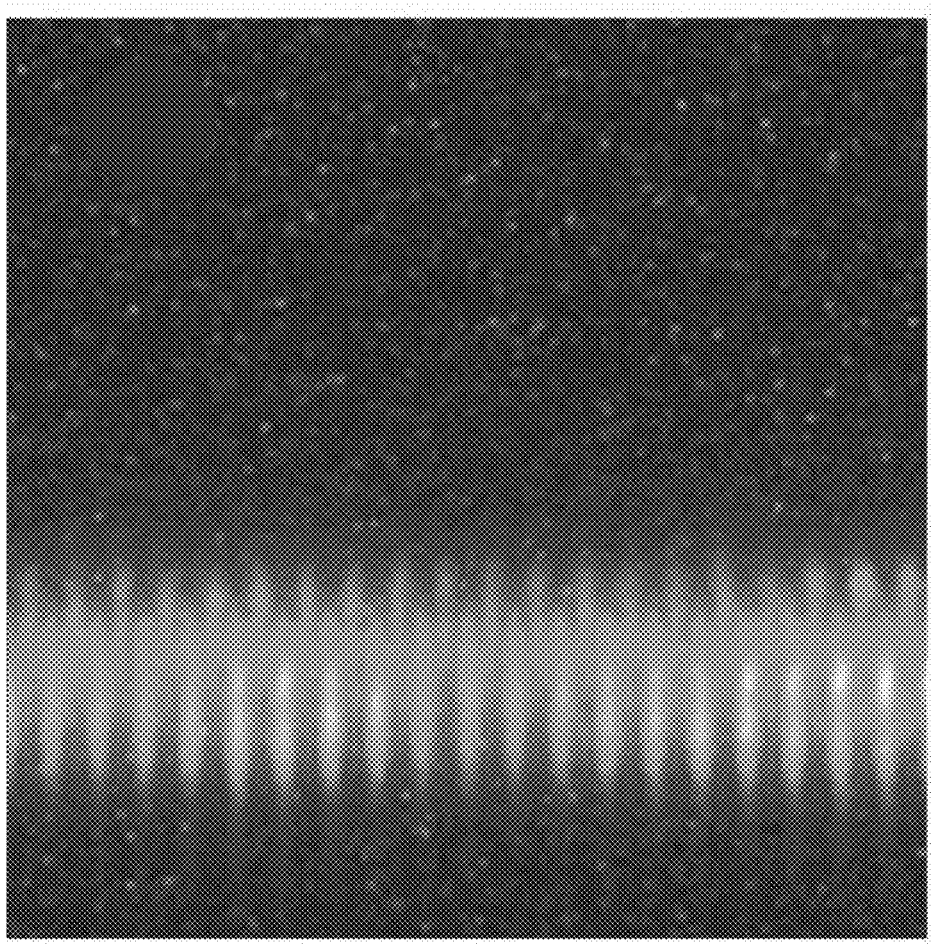
Figure 7E:
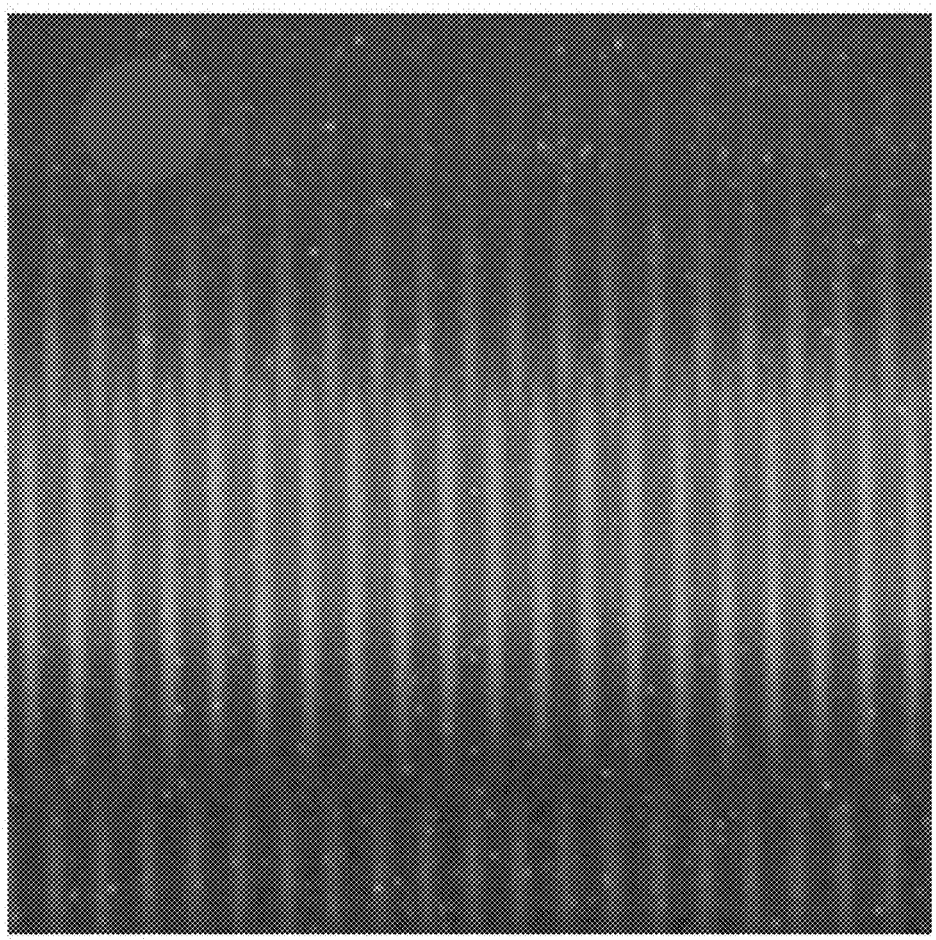
Figure 7F:
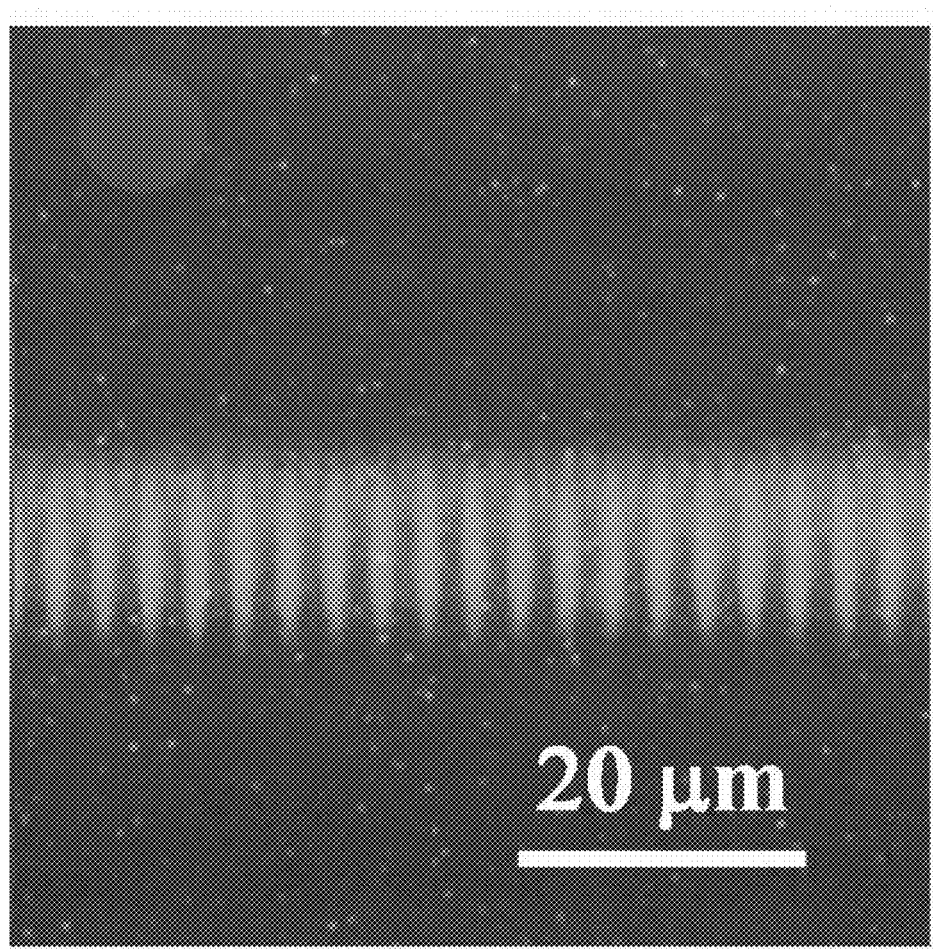

The lens-fiber distance is initially optimized by viewing the images of the sub beams 504A and 504B that are projected on to the screen. For a given fiber diameter, the optimal lens-fiber distance that results in the beam waist overlapping with the fiber core can be correlated with a specific pattern of the diffracted beam images on the screen 521. The optimal fiber-lens distance is found by varying the position of the optical fiber 509 by simultaneously moving fiber clamps 519 and 520 along the Z-axis and by monitoring the diffracted orders on the screen 521 using viewing cameras 523 and 524 attached to controller 209 through a feedback loop. Similarly the tilt of the lens 502, phase mask 503 and fiber 509 in the XY plane can be optimized by inspecting the image patterns on screen 521 again in a feedback loop controlled by controller 209. This process represents an initial coarse alignment of the inscription set up. To achieve the phase mask—fiber separation d, the camera 525 is used to monitor the distance d while the stage 503C translates the phase mask along the Z-axis. The line foci and beam waists of the diffracted beams 504A and 504B must be overlapped within the core of the fiber with a positional resolution of a couple of microns. A fine adjustment process is needed to optimize the alignment. Thomas et al describe a method of exploiting photoluminescence that is generated in Ge-doped silica fibres by 800 nm femtosecond pulse duration radiation when aligning a focusing beam from a phase mask onto the fiber core in Appl. Phys. A 86, 153-157 (2007). Unlike the UV case where the photoluminescence is the result of a single photon absorption by GeO defects in a germanium doped optical fiber core, the photoluminescence is thought to be the result of frequency doubling of the incident 800 nm radiation at the core/cladding interface. It could also result by multiphoton absorption of many low energy infrared photons rather than a single UV photon. Kazansky et al. demonstrated in Phys. Rev. Lett. 82 (10), 2199-2202 (1999) that 800 nm irradiation of Ge-doped silica with femtosecond duration pulses produced photoluminescence at 410 nm due to multi-IR photon absorption. We define nonlinear induced photoluminescence to mean the photoluminescence that results from multiphoton absorption rather than single photon absorption. The resultant photoluminescence that is emitted radially from the irradiated core of the optical fiber can be monitored by a spectrometer via a coupled fiber that is placed adjacent to the exposure region of the target fiber. The inventors have discovered that this photoluminescence is observed in fibers which do not necessarily have Ge-doped cores. In the case of Ge-doped fibers, Rourke et al. in U.S. Pat. No. 5,945,261 observe a decrease in photoluminescence as colour centre defects responsible for the UV-laser induced index change in the fiber are depleted with UV exposure. The inventors here have discovered that in the case of pure silica core fluorine doped cladding fibers, the photoluminescence is at 460 nm and the intensity of the photoluminescence increases with index change. The 460 nm band is consistent with a photoluminescence band observed by Watanabe et al. in Physical Review B vol. 60 no. 14 pg. 9959 (1999) with femtosecond pulse duration 800 nm irradiation of vitreous silica. It was associated with oxygen vacancy colour center defect absorption. When diffracted beams 504A and 504B are optimally overlapped, maximization of the peak intensity of the interference pattern 505 is also realized. Maximal overlap of the interference pattern 505, generated by the phase mask, with the fiber core 508 will maximize the generated photoluminescence. The intensity of the photoluminescence that is emitted radially from the fiber can be monitored using the detector 526 that is placed proximate the beam overlap area of the fiber core. Radially emitted photoluminescence can be detected in this fashion if the fiber jacket is not absorbing at the wavelength of the luminescence (400 nm for Ge-doped silica fibers, 460 nm for fluorine doped cladding pure silica core fiber) if a video camera with sufficient sensitivity at the luminescent wavelength of interest is obtained. By introducing imaging optics 601 as shown in FIG. 6, and replacing the photodetector 526 with a CCD camera 602, the blue photoluminescence $\lambda_2$ produces an image of the interference pattern created by the phase mask 503 within the fiber core 508. The image of the interference pattern changes as a function of the phase mask-fiber distance d. In FIG. 7A the order walk-off effect has produced a 2-beam interference pattern with a period that is half that of the phase mask. As the phase mask is moved closer to the fiber, the diffracted orders no longer walk off each other resulting in multiple beam interference and Talbot imaging of the diffraction pattern from the mask as observed in FIG. 7E. By careful positioning of the phase mask-fiber distance d, a phase shift in the Talbot image of the diffraction pattern can be placed and photoinscribed into the fiber core as shown in FIG. 7C. Alignment based on nonlinear photoluminescence can be performed at femtosecond laser pulse energies that are three to four times lower than those used during the actual fiber Bragg grating inscription process. The inventors have also discovered that visible light ($\lambda_3$ in FIG. 6 that is >600 nm) when launched into the optical fiber is scattered by femtosecond laser induced modification in the fiber core region and can therefore be collected by the objective lens 601 oriented orthogonally to the optical fiber 509. Such a dark field microscopy setup completely excludes the probe light at $\lambda_3$ from the image and is sensitive to even weak induced refractive index changes (index modulations of $10^{-6}$) in the fiber core region. Such index modulations are typically produced during the alignment process based on nonlinear photoluminescence and by additionally monitoring them using the above dark field microscopy setup one can judge whether the desired accuracy in the alignment has been achieved. Radial scattering of launched red light ($\lambda_3$=637 nm) from induced gratings are observed in FIGS. 7B, 7D and 7F for the corresponding photoluminescence patterns observed in FIGS. 7A, 7C, and 7E, respectively. In this example, the strong scattered/reflected $\lambda_1$=800 nm radiation of the femtosecond writing beam is blocked by placing a blocking/shortpass filter 603 in front of the CCD camera 602. Observation of the scattering of the launched visible light could also be used to optimize alignment during exposure. The optical source 413 of FIG. 4 can include such a red light source.

Figure 8:
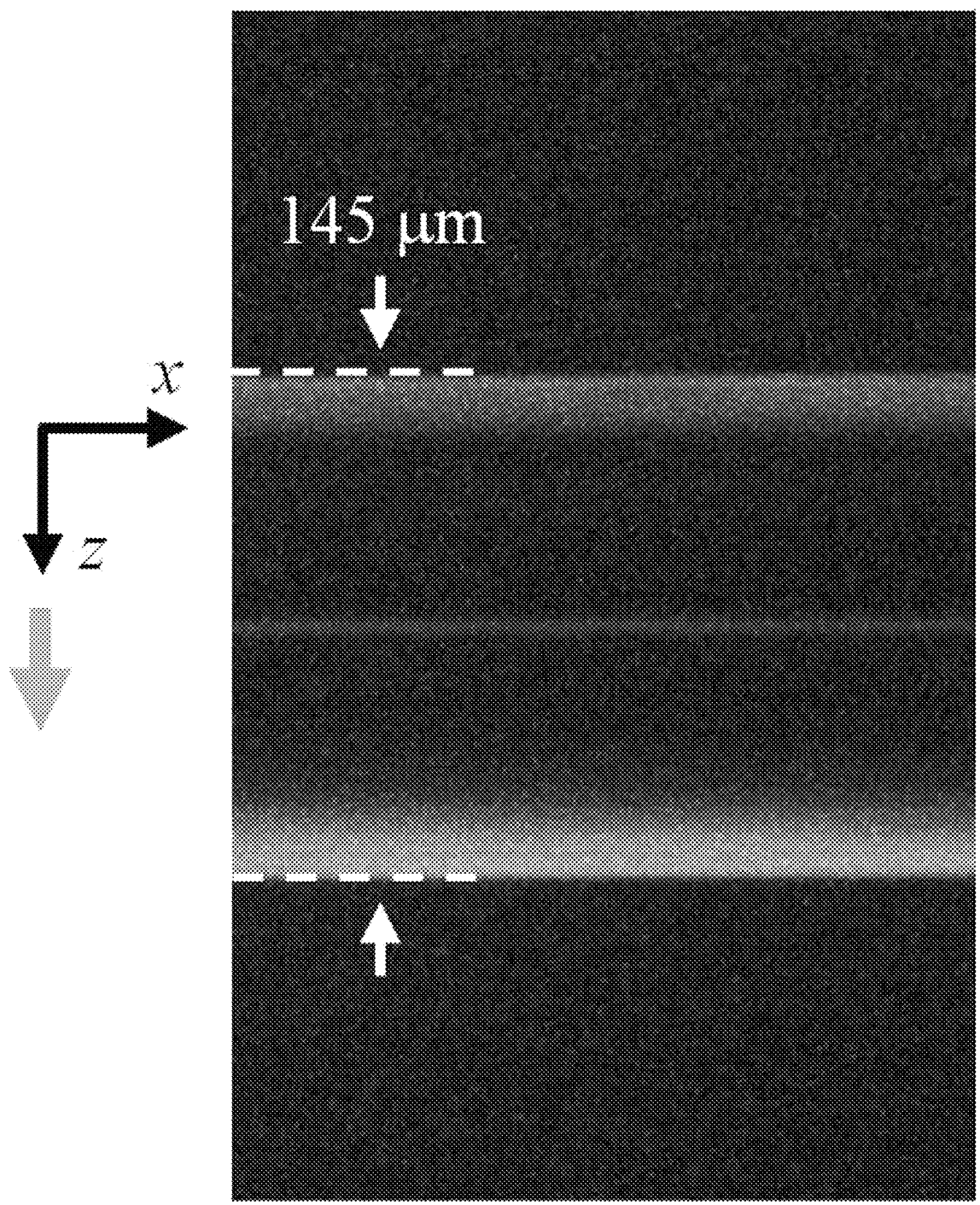
FIG. 8 presents an image of the laser induced photoluminescence in the core of a polyimide coated fiber that is optimal for grating inscription.

For some optical fiber sensing applications, it is desirable to have fibers coated with the polymer polyimide which is thermally stable polymer up to 400° C. Polyimide is highly absorbing in the blue (below 500 nm) therefore radially emitted blue luminescence is absorbed in the fiber coating. By increasing the repetition rate of the inscription laser the attenuated beam generates photoluminescence that is still detectable even through protective coatings such as polyimide that strongly absorb at the photoluminescent wavelengths in the blue thus allowing for beam optimization. FIG. 8 presents an image obtained with system depicted in FIG. 6 of the optimal photoluminescence induced in the core of a polyimide coated optical fiber.

To fabricate thermally stable gratings, short Fourier transform limited femtosecond duration pulses are undesirable. It is preferable to introduce a temporal chirp to the pulse increasing its pulse duration from 200 to 500 fs in order to promote nano-grating formation in the peak intensity regions of the aligned interference field. By chirping the pulse to 500 fs and reducing the repetition rate to 100 Hz, high index modulation gratings can be inscribed through the protective polymer coating that are thermally stable.

Figure 9:
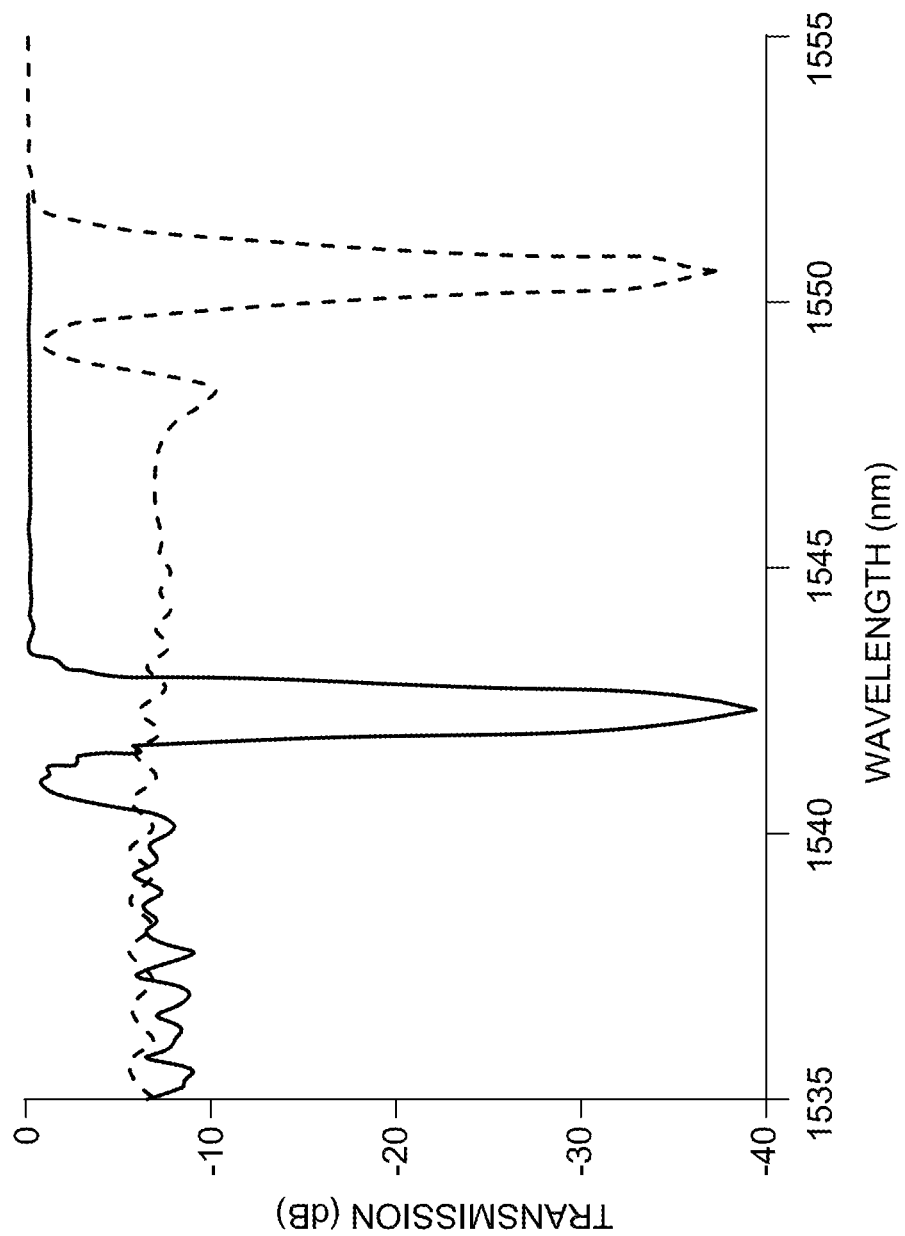
FIG. 9 presents transmission spectra of Type II fiber Bragg gratings written through the protective polyimide coatings of the fiber at room temperature and 1000° C.

FIG. 9 presents transmission spectra of the Bragg grating written in Ge-doped silica single mode fiber through the polyimide coating. The solid trace shows the grating spectrum at room temperature while the dashed trace shows the grating spectrum at 1000° C. Confirmation of the thermal stability of the grating is confirmed by performing an isochronal annealing study of the grating, raising the device temperature in 100° C. increments and allowing the device to stabilize at the given temperature for 1 hour. The variation in wavelength of the fiber grating resonance as a function of the annealing temperature and time is given in FIGS. 10A and 10B. After an initial wavelength shift of roughly 100 pm during the first 24 hours at 1000° C., the Bragg wavelength remained stable for the remaining 200 hour duration of the test. From transmission measurements, the $\Delta n$ fluctuated between $1-1.2\times 10^{-3}$. It is seen that even after hundreds of hours at 1000° C. the grating index modulation remains stable indicating that the FBG is the result of a type II index change.

Although the polyimide coating does not survive the extreme temperatures presented here, it is advantageous to form thermally stable gratings through such coatings for applications where the coating will survive, for example for sensing applications in the oil and gas industry such steam assisted gravity drainage or cyclic steam generation where sensors need to survive temperatures up to 350° C. Even for higher temperatures where a coating will ultimately degrade, it is advantageous to form FBG arrays directly through such protective coatings from a manufacturing and handling perspective where coating burn off is taken into consideration after a sensor has been packaged and deployed.

Alternatively, some of the radially emitted blue luminescence will couple into the optical fiber core and be guided by the fiber to the fiber end. The intensity of the blue luminescence that couples along the fiber to the spectrometer detector 418, seen in FIG. 4, is maximized when the line foci and beam waists of the diffracted beams 504A and 504B overlap with the fiber core. This approach to optimize the alignment of the beam writing the Bragg grating can be performed irrespective of the absorption profile of the fiber coating.

A weaker photoluminescence at 650 nm associated with non-bridging oxygen hole center defects (NBOHC) in vitreous silica can also be used to optimize alignment of the irradiating beams with the fiber core if the scattered photoluminescence associated with the NBOHC defect is guided along the fiber core to the spectrometer 418.

The inventors have discovered that maximization of the photoluminescence coincides with optimal conditions for induction of index change in the resultant grating. In order to maximize the photoluminescence in the fiber for a given pulse energy and alignment, it is important to optimize the femtosecond beam 202 exiting the laser source 201. For example, the compressor of the regenerative amplifier is adjusted to pre-chirp the pulse so that when the beam arrives at the fiber core 508, any chromatic or temporal dispersion arising from the beam's passage through the beam division optics 206, the beam manipulation and imaging optics 207, and the optical components of the FBG writing station 208 is compensated for by applying the opposite amount of dispersion. As another example, the switch-out time of the pulse from the regenerative amplifier is optimized for maximum photoluminescence, where the switch-out time defines the number of round trips the pulse makes in the amplifier cavity. In this way, a Fourier transform limited pulse duration of the incident beam is maintained at the core of the optical fiber. A Fourier transformed limited pulse, that is the shortest pulse duration achievable with the source 201, is desirable for induce Type I or smooth index change. There are cases where it is desirable to have a pulse that is other than Fourier transform limited, such as temporally chirped pulses which is advantageous for thermally stable Type II index change which is associated with the formation of form birefringent nano-grating structures in the glass as taught by Taylor et al. in U.S. Pat. No. 7,033,519.

These alignment techniques based on photoluminescence and photoluminescence imaging could be applied to optimize and monitor the inscription of structures in the fiber cladding as taught by Mihailov et al. in U.S. Pat. No. 7,689,087. Alternatively these alignment techniques could be applied to optical fiber waveguides that are absent a core region, defined here as optical fiber rods, such as crystalline sapphire optical fiber, in order to localize regions of index change with optical fiber rods. Alternatively these alignment techniques are not limited to silica based optical fibers but could include other glass materials such as ZBLAN, phosphate, chalcogenide, bismuth oxide, or crystalline materials like diamond, sapphire, or lithium niobate.

Femtosecond laser induced photoluminescence is not only limited to passive optical fiber waveguides but has been observed in fibers with active dopants where the fibers are used for fiber lasers. In the Ph.D. thesis of Elodie Wikszak of the Friedrich-Schiller University in Jena Germany (2009), silica based fibers with active dopants of Erbium and Ytterbium were observed to have unique photoluminescent spectra. For Erbium doped fibers photoluminescence was observed at 450 nm and 520 nm while Ytterbium doped silica fibers had photoluminescence at 450 nm. As an alternative, these technique for alignment could be applied to glass or crystalline optical fibers that are doped with active ions such as Erbium, Ytterbium, Holmium or Thulium.

Another technique that can be used to optimize alignment is not dependent on laser induced photoluminescence but instead uses very low pulse energies that produce very weak gratings (index modulations of $10^{-6}$), for example <30 µJ for a 35 fs pulse focused through a 1.071 µm period silica phase mask with an 8 mm focal length acylindrical lens. After the initial alignment utilizing diffracted beam images on the screen 521, the focusing lens 502 is dithered in the X and Z direction (506 of FIG. 5) to determine the position that produces the maximum refractive index modulation growth rate as determined while observing growth of the weak grating in reflection or transmission.

Once aligned, beam attenuator 302 is adjusted to increase the beam energy for grating inscription. The lens 502 is then dithered along the direction of the X-axis in order to scan the beam across the core of the optical fiber along the X-axis. Grating growth is monitored by the optical spectrum analyzer 417 shown in FIG. 4. Limited tuning of the Bragg resonance can be realized if the stages 519 and 520 apply tension to the fiber along the Y-axis.

In some cases it may be necessary to scan the femtosecond beam across the phase mask along the Y-axis in order to inscribe a Bragg grating longer than the width of the inscription beam 419A. To do this, the turning mirror 501 and the cylindrical lens 502 are mounted on a stage 527 that translates along the Y-axis in the direction of the fibre axis.

Once the inscription is completed, clamps 519 and 520 release and the drive mandrel 410 translates the portion of the fiber containing the Bragg grating into the annealing station 407 where the temperature of the grating is elevated in order to remove thermally unstable portions of the induced index change of the grating. Alternatively a $CO_2$ laser beam can be focused onto the Bragg grating 507 to heat the fiber to remove the unstable portions of the index change.

In an exemplary embodiment, an FBG writing system is comprised of;
a. a femtosecond pulse duration laser system;
  i. a femtosecond beam delivery system comprising beam multiplexers to produce multiple source beams that are directed to multiple FBG writing stations, each source beam potentially directed into a beam manipulation and attenuation system for controlling beam energy and dispersion before entering a FBG writing station;
b. an FBG writing station which accepts the beam exiting the beam manipulation and attenuation system comprising;
  i. Tension controlled fiber spooling system at each writing station handling and delivery system—a) motorized fiber spool b) FBG writing head (it may be part of the lens subsystem since has to be on the same optical axis)
  ii. Focusing lens sub-system (with at least one dimensional dithering
    1. scanning capability and another translation capability for the relative position of the lens fiber spacing to allow for different focusing configuration and different phase mask orders. The focusing lens sub-system may be comprised of an imaging telescope system used to write different Bragg grating pitches as per International Patent Application No. PCT/CA2015/000429.
  iii. Phase mask subsystem stages for alignment and relative positioning of phase mask to fiber—with two dimensional mapping capability to allow for the selection of different phase masks on the same substrates.
  iv. Beam alignment system comprising either transversal or axial spectroscopic monitoring of nonlinear laser induced photoluminescence which depends on optimal overlap of diffractive orders with fiber core as well as a computer controlled feedback loop to control fiber, phase mask and focusing lens tilt and x,y,z positioning
  v. Localized fiber clamping system to apply tension for limited wavelength tuning of FBG.
  vi. FBG characterization and measuring system (synchronized with the laser exposure/shutter), may be shared between writing stations.
  vii. FBG annealing subsystem (either in hot nitrogen or $CO_2$ laser annealing with nitrogen gas purge)
c. Global command system (computer/software to coordinate the process steps of beam delivery and fiber delivery within each FBG writing station; Fiber positioning, Shutter opening & closing, Grating spectral)

In conclusion, alignment techniques based on Ge—O defect photoluminescence would work for non-Ge doped fibers. The inventors have discovered that in pure silica core fibers there is a photoluminescence at 460 nm as well as 650 nm (red light) that can be used to optimize alignment. Unlike Ge—O photoluminescence which decreases with exposure, the 460 and 650 nm luminescent intensity increases with exposure in the case of pure silica core fibers.

Writing through fiber protective polymer coatings like acrylate and polyimide is known with fs IR lasers. Photoluminescent monitoring for fs laser alignment in coated fiber is not reported. End face Photoluminescent monitoring of fs-laser induced photoluminescence is not reported (in either coated or uncoated fiber). For fibers coated with polyimide, a favoured fiber optic coating material for fiber optic sensing, the fluorescent blue light (400 or 460 nm) is absorbed by the coating and not observable from the side of the fiber therefore only end-face fiber monitoring. Monitoring of 650 nm photoluminescence for alignment has never been reported.

Insitu monitoring of the photoluminescence pattern within the fiber and the fiber core created by the fs beam has never been reported. Insitu visualization of the interference electromagnetic field pattern created by the phase mask is a powerful alignment tool to ensure either pure two beam interference or high intensity multiple beam interference. Examples where these features of the interference field are important are for creation of fiber laser cavity mirrors (two beam) or high temperature stable fiber Bragg grating sensors (multiple beam).

Throughout the foregoing description, any measurements or quantities are not intended to be exact or precise. Minor variations are possible.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

The invention claimed is:

1. An alignment system for use in an ultrashort pulse duration laser-based Fiber Bragg Grating (FBG) writing system, the electromagnetic radiation having a pulse duration of less than or equal to 5 picoseconds, and the wavelength of the electromagnetic radiation having a characteristic wavelength in the wavelength range from 150 nm to 3.0 microns, the alignment system comprising:
  a holder configured to hold an optical fiber in a position perpendicular to a beam path of an ultrashort pulse duration laser-based FBG writing station;
  an optical detector; and
  a control system with an input from the optical detector and an output to adjust parameters of an optical writing source and the FBG writing station based on photoluminescence generated in the optical fiber as indicated in a signal received at the input from the optical detector.

2. The alignment system of claim 1, wherein the optical fiber is coated.

3. The alignment system of claim 1, wherein an external light source is coupled into the core of the optical fiber.

4. The alignment system of claim 3, wherein the optical detector is positioned to visualize/image ultrashort pulse duration laser induced modification in the optical fiber based on collecting a scattered component of external light source that is coupled into the optical fiber using the external source.

5. The alignment system of claim 1, wherein the parameters are adjusted based on photoluminescence generated in a core of the optical fiber.

6. The alignment system of claim 1, wherein the parameters are adjusted based on photoluminescence generated in cladding of the optical fiber.

7. The alignment system of claim 1, wherein the parameters comprise at least one of: chirping a compressor of a regenerative amplifier of a writing source; polarization of the writing source; alignment of a phase mask in terms of rotation, tilt, distance to fiber; and alignment of the optical fiber in terms of its distance from a focus, distance from the phase mask, tilt of the fiber with respect to a cylindrical focus of a writing beam.

8. The alignment system of claim 7, wherein the optical fiber is a sapphire fiber and the parameters additionally comprise fiber rotation.

9. The alignment system of claim 8, wherein the optical fiber is a microstructured fiber.

10. The alignment system of claim 1, wherein the ultra-short pulse duration laser-based FBG writing station generates IR pulses.

11. The alignment system of claim 1, wherein the ultra-short pulse duration laser-based FBG writing station generates femtosecond duration laser pulses.

12. The alignment system of claim 1, wherein the optical detector is positioned to detect non-linear induced photoluminescence in the fiber axially.

13. The alignment system of claim 1, wherein the optical detector is positioned to detect non-linear induced photoluminescence in the fiber transversally.

14. The alignment system of claim 1, wherein the optical fiber comprises a core section and a cladding section, and the control system monitors a photoluminescence pattern within the fiber cladding, the fiber core or both.

* * * * *